(12) United States Patent
Kim et al.

(10) Patent No.: US 12,066,893 B2
(45) Date of Patent: *Aug. 20, 2024

(54) SEMICONDUCTOR MEMORY DEVICES

(71) Applicant: Samsung Electronics Co., Ltd., Suwon-si (KR)

(72) Inventors: Sungrae Kim, Suwon-si (KR); Kijun Lee, Suwon-si (KR); Myungkyu Lee, Suwon-si (KR); Yeonggeol Song, Suwon-si (KR); Jinhoon Jang, Suwon-si (KR); Sunghye Cho, Suwon-si (KR); Isak Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,622

(22) Filed: Jul. 26, 2023

(65) Prior Publication Data

US 2023/0367672 A1    Nov. 16, 2023

Related U.S. Application Data

(63) Continuation of application No. 17/580,048, filed on Jan. 20, 2022, now Pat. No. 11,762,736.

(30) Foreign Application Priority Data

May 18, 2021 (KR) .................. 10-2021-0063798
Sep. 29, 2021 (KR) .................. 10-2021-0128525

(51) Int. Cl.
*G06F 11/10* (2006.01)
*G06F 11/07* (2006.01)
(Continued)

(52) U.S. Cl.
CPC .................. *G06F 11/1068* (2013.01)

(58) Field of Classification Search
CPC .................................... G06F 11/1068
See application file for complete search history.

(56) References Cited

U.S. PATENT DOCUMENTS 3,657,700 A    4/1972   Lutzker
8,392,810 B2   3/2013   Linsky et al.
(Continued)

FOREIGN PATENT DOCUMENTS

KR   1020190118027 A   10/2019

*Primary Examiner* — Guy J Lamarre
(74) *Attorney, Agent, or Firm* — Muir Patent Law, PLLC

(57) ABSTRACT

A semiconductor memory device includes a memory cell array, a link error correction code (ECC) engine and on-die ECC engine. The memory cell array includes a plurality of volatile memory cells. The link ECC engine provides a main data by performing a first ECC decoding on a first codeword including the main data and a first parity data, and generates a first error flag based on a result of the first ECC decoding. The on-die ECC engine generates a second parity data by performing a first ECC encoding on the main data, provides a target page of the memory cell array with a second codeword including the main data and the second parity data in response to the first error flag being deactivated or generates a third codeword by changing at least one of bits of the second codeword in response to the first error flag being deactivated.

20 Claims, 25 Drawing Sheets

(51) Int. Cl.
    *G06F 11/30*     (2006.01)
    *G06F 13/16*     (2006.01)
    *G06F 13/28*     (2006.01)

(56) References Cited

U.S. PATENT DOCUMENTS

| | | |
|---|---|---|
| 8,413,007 B2 | 4/2013 | Pawlowski et al. |
| 8,495,438 B2 | 7/2013 | Roine |
| 8,601,341 B2 | 12/2013 | Pawlowski et al. |
| 9,141,472 B2 | 9/2015 | Giovannini et al. |
| 9,965,352 B2 | 5/2018 | Suh et al. |
| 10,347,323 B2 | 7/2019 | Kim et al. |
| 10,802,934 B2 | 10/2020 | Nguyen et al. |
| 10,846,171 B2 | 11/2020 | Cho et al. |
| 10,936,409 B2 | 3/2021 | Kwak et al. |
| 10,956,260 B2 | 3/2021 | Park et al. |
| 11,762,736 B2 * | 9/2023 | Kim .................. G06F 11/1012 714/764 |
| 11,860,734 B2 * | 1/2024 | Kim .................. G06F 11/1012 |
| 2008/0052603 A1 | 2/2008 | Wiatrowski et al. |
| 2018/0203625 A1 | 7/2018 | Zhang et al. |
| 2019/0340067 A1 | 11/2019 | Kim et al. |
| 2020/0218608 A1 | 7/2020 | Zhu |
| 2020/0218611 A1 | 7/2020 | Cha et al. |
| 2020/0401474 A1 | 12/2020 | Artieri et al. |
| 2021/0011804 A1 | 1/2021 | Wiita et al. |
| 2023/0065623 A1 | 3/2023 | Sharma et al. |

\* cited by examiner

FIG. 11

$$CW2(DQ+PRT2) \otimes [\underbrace{000\cdots000}_{DFDQ}, \overbrace{\underbrace{10111111}_{PEP1}}^{128b}] = CW31(DQ+PRT31)$$

FIG. 12

$$PRT31 = PRT2 \otimes PEP1$$

FIG. 13

$$SDR21 = PRT2 \otimes \underbrace{PRT2 \otimes PEP1}_{PRT31}$$

FIG. 14

$$CW2(DQ+PRT2) \otimes [\underbrace{\overbrace{000\cdots000}^{128b},11110111}_{DFDQ\ \ \ PEP2}] = CW32(DQ+PRT32)$$

FIG. 15

$$PRT32 = PRT2 \otimes PEP2$$

FIG. 16

$$SDR22 = \underbrace{PRT2 \otimes PRT2}_{PRT32} \otimes PEP2 = PEP2$$

FIG. 17

| DSF[0:1] | STATUS |
|---|---|
| 00 | NE |
| 01 | CE |
| 11 | LUE |
| 10 | DUE |

SEMICONDUCTOR MEMORY DEVICES

CROSS-REFERENCE TO RELATED APPLICATION(S)

This application is a continuation of U.S. application Ser. No. 17/580,048, filed on Jan. 20, 2022, which claims priority under 35 U.S.C. § 119 to Korean Patent Application No. 10-2021-0063798, filed on May 18, 2021 and to Korean Patent Application No. 10-2021-0128525, filed on Sep. 29, 2021 in the Korean Intellectual Property Office, the disclosure of which are incorporated by references herein in their entirety.

BACKGROUND

1. Technical Field

Example embodiments relate to memory fields, and more particularly to semiconductor memory devices.

2. Discussion of the Related Art

Semiconductor memory devices may be classified into non-volatile memory devices such as flash memory devices and volatile memory devices such as dynamic random access memories (DRAM)s. High speed operation and cost efficiency of DRAMs make it possible for DRAMs to be used for system memories. Due to the continuing shrink in fabrication design rule of DRAMs, bit errors of memory cells in the DRAMs may rapidly increase and yield of the DRAMs may decrease.

SUMMARY

Some example embodiments provide a semiconductor memory device including an on-die error correction code (ECC) engine capable of identifying a pattern of uncorrectable errors.

According to an embodiment of the present invention, a semiconductor memory device includes a memory cell array including a plurality of volatile memory cells coupled to a plurality of word-lines and a plurality of bit-lines, a link error correction code (ECC) engine receiving a first codeword received from a memory controller, wherein the first codeword includes main data and a first parity data, and performing a first ECC decoding on the first codeword to generate the main data from the first codeword and a first error flag based on a result of the first ECC decoding, the first error flag being activated in response to the first codeword including a first type of uncorrectable errors which occurs during a time when the first codeword is being transmitted from the memory controller to the semiconductor memory device, and an on-die ECC engine receiving the main data from the link ECC engine, performing a first ECC encoding on the main data received from the link ECC engine to generate a second parity data, generating a second codeword including the main data and the second parity data, and providing, in response to the first error flag, a first target page of the memory cell array with one of the second codeword and a third codeword. The on-die ECC engine, in response to the first error flag being deactivated, provides the second codeword to the first target page of the memory cell array. The on-die ECC engine, in response to the first error flag being activated, generates the third codeword by changing at least one of bits of the second codeword based on a first type of error pattern associated with the first type of uncorrectable errors, and provides the third codeword to the first target page of the memory cell array.

According to an embodiment of the present invention, a semiconductor memory device includes a memory cell array including a plurality of volatile memory cells coupled to a plurality of word-lines and a plurality of bit-lines, a link error correction code (ECC) engine providing main data by performing a first ECC decoding on a first codeword including the main data and a first parity data received from a memory controller, and generating a first error flag based on a result of the first ECC decoding, the first error flag being activated in response to the first codeword including a first type of uncorrectable errors which occurs during a time when the first codeword is being transmitted from the memory controller, and an on-die ECC engine receiving one of the main data and a codeword that is pre-stored in a first target page of the memory cell array, generating a second parity data by performing a first ECC encoding on the main data, performing a second ECC decoding on the pre-stored codeword, generating a second error flag that is activated in response to the pre-stored codeword including a second type of uncorrectable errors which occurs in memory cells in the first target page, providing, in response to a second codeword including a correctable error or no errors, based on the first error flag and the second error flag, a second target page of the memory cell array with a second codeword including the main data and the second parity data, generating, in response to the second codeword being associated with one of the first type of uncorrectable errors and the second type of uncorrectable errors, a third codeword by changing at least one bit of the second codeword based on different error patterns associated with the first type of uncorrectable errors and the second type of uncorrectable errors, and providing the third codeword to the second target page.

According to an embodiment of the present invention, a semiconductor memory device includes a memory cell array including a plurality of volatile memory cells coupled to a plurality of word-lines and a plurality of bit-lines, and an on-die error correction code (ECC) engine receiving, in a write operation, data and a first poison flag from a memory controller, the first poison flag indicating whether the data are poisoned data, generating a first parity data by performing an ECC encoding on the data, generating a second codeword by applying a first type of error pattern to a first codeword including the data and the first parity data based on the first poison flag, and providing the second codeword to a target page of the memory cell array. The on-die ECC engine reads, in a read operation, the second codeword from the target page, recovers the data by performing an ECC decoding on the second codeword, generates a second poison flag and a decoding status flag based on a result of the ECC decoding, and transmits the data, the second poison flag and the decoding status flag to the memory controller. The second poison flag is activated in response to the data corresponding to the poisoned data. The decoding status flag is activated in response to the data including uncorrectable errors.

Accordingly, in the semiconductor memory device according to example embodiments, the on-die ECC engine, when the on-die ECC engine performs a memory operation based on at least one of the main data and a codeword that is pre-stored in a target page, may generate a third parity data by applying different error patterns to the first type of uncorrectable errors associated with a main data provided from an outside and the first type of uncorrectable errors associated with the pre-stored codeword. In addition, the on-die ECC engine may identify a type of the uncorrectable errors based on syndrome matching the different error patterns.

BRIEF DESCRIPTION OF THE DRAWINGS

Illustrative, non-limiting example embodiments will be more clearly understood from the following detailed description taken in conjunction with the accompanying drawings.

FIG. 11 illustrates an example operation of the error data generator in the on-die ECC engine of FIG. 5 according to example embodiments.

FIG. 12 illustrates that the third parity data is generated in FIG. 11.

FIG. 13 illustrates that the syndrome is generated based on the third codeword in FIG. 11.

FIG. 14 illustrates another example operation of the error data generator in the on-die ECC engine of FIG. 5 according to example embodiments.

FIG. 15 illustrates that the third parity data is generated in FIG. 14.

FIG. 16 illustrates that the syndrome is generated based on the third codeword in FIG. 14.

FIG. 17 illustrates the decoding status flag and status of error of the main data in the on-die ECC engine of FIG. 5.

DETAILED DESCRIPTION OF THE EMBODIMENTS

Various example embodiments will be described more fully hereinafter with reference to the accompanying drawings, in which some example embodiments are shown.

Figure 1:
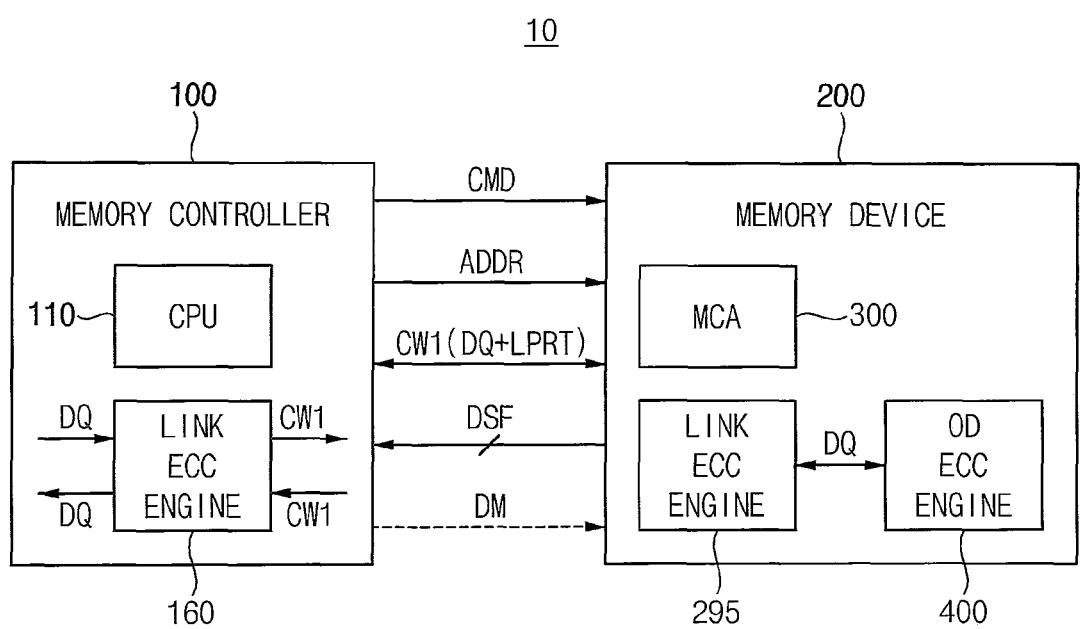
FIG. 1 is a block diagram illustrating a memory system according to example embodiments.

FIG. 1 is a block diagram illustrating a memory system according to example embodiments.

Referring to FIG. 1, a memory system 10 may include a memory controller 100 and a semiconductor memory device 200.

The memory controller 100 may transmit a command CMD and an address ADDR to the semiconductor memory device 200 and may exchange a first codeword CW1 including a main data DQ and a link parity data LPRT with the semiconductor memory device 200. The memory controller 100 may transmit a data mask signal DM associated with a masked write operation to the semiconductor memory device 200. The semiconductor memory device 200 may transmit a decoding status flag DSF to the memory controller 100.

In some embodiments, the semiconductor memory device 200 is a memory device including a plurality of dynamic (volatile) memory cells such as a dynamic random access memory (DRAM), DDR5 (double data rate) synchronous DRAM (SDRAM) and DDR6 (double data rate) synchronous DRAM (SDRAM).

The memory controller 100 may include a system a central processing unit (CPU) 110 and a link ECC engine 160, and the semiconductor memory device 200 may include a link ECC engine 295, an on-die ECC engine 400 and a memory cell array 300.

In example embodiments, the memory controller 100 may not include the link ECC engine 160 and the semiconductor memory device 200 may not include the link ECC engine 295.

The CPU 110 may control overall operation of the memory controller 100.

The link ECC engine 160 may perform a link ECC encoding on the main data DQ provided from a host to generate the link parity data LPRT and may transmit, to the semiconductor memory device 200, the first codeword CW1 including the main data DQ and the link parity data LPRT. The link parity data LPRT may be used for detecting/ correction errors which occur during the main data DQ is being transmitted. In addition, the link ECC engine 160 may perform a link ECC decoding on the first codeword CW1 provided from the semiconductor memory device 200 to recover the main data DQ. The link parity data LPRT may be referred to as a first parity data. When the main data DQ may include 128 bits, the link parity data LPRT may include 9 bits.

The link ECC engine 295 may perform a link ECC decoding operation (a first ECC decoding operation) on the first codeword CW1 by using a first ECC to recover the main data DQ, and may provide the main data DQ to the on-die ECC engine 400. The link ECC engine 295 may provide a first error flag EF1 (refer to FIG. 3) to the on-die ECC engine 400. The first error flag EF1 may be activated when the link ECC engine 295 detects, in the link ECC decoding, a first type of uncorrectable errors (i.e., uncorrectable errors of a first type) in the main data DQ. The uncorrectable errors of a first type may occur to the first codeword CW1 during a time when the first codeword CW1 is being transmitted from the memory controller 100 to the semiconductor memory device 200. The first ECC may be implemented with H-matrix and may include a single error correction/double error detection (SECDED) code or cyclic redundancy check (CRC) code.

When the main data DQ may include 128 bits, the link ECC engine 295 may generate, in the link ECC decoding, 9-bit check bits based on the first ECC and may selectively activate the first error flag EF1 based on comparison of the link parity data LPRT and the check bits.

The on-die ECC engine 400, in a normal write operation, may perform an ECC encoding on the main data DQ based on a second ECC to generate a second parity data which is used for detecting/correction errors occurring in memory cells of the memory cell array 300. When the main data DQ may include 128 bits, the second parity data may include 8 bits. The second ECC may be implemented with H-matrix and may include a single error correction (SEC) code for correcting one error bit in the main data DQ or SECDED code.

The on-die ECC engine 400, in response to the activated first error flag EF1, may generate a third codeword by applying a first type of error pattern to a second codeword including the main data DQ and the second parity data. The first type of error pattern may identify the first type of uncorrectable errors. For example, the first type of error pattern may indicate that the main data DQ include uncorrectable errors. The on-die ECC engine 400 applies the first type of error pattern to the first codeword by inverting (flipping) at least one bit of the link parity data LPRT (i.e., the first parity data), or by inverting at least one bit of the first codeword to generate the second codeword. The application of the first type of error pattern to the first codeword means flipping of at least one bit of the link parity data LPRT or inverting at least one bit of the first codeword (i.e., modifying the first codeword to identify that the main data of the first codeword have uncorrectable errors).

For example, the on-die ECC engine 400, in response to the activated first error flag EF1, may convert the second parity data to a third parity data by applying the first type of error pattern to the second parity data in the second codeword and may generate the third codeword including the main data DQ and the third parity data. Example embodiments, however, are not limited thereto. In some embodiments, the on-die ECC engine 400 may generate the third codeword by change at least one of bits of the second codeword including the main data DQ and the second parity data based on the first type of error pattern.

The on-die ECC engine 400, in a memory operation based on at least one of the main data and a codeword that is pre-stored in a target page of the memory cell array 300 such as a masked write operation and a scrubbing operation, may perform a second ECC decoding on the pre-stored codeword by using the second ECC.

The on-die ECC engine 400 may activate a second error flag EF2 (refer to FIG. 5), when the on-die ECC engine 400 detects a second type of uncorrectable errors (i.e., uncorrectable errors of a second type) in the pre-stored codeword and may generate the third codeword by applying a second type of error pattern to the second codeword. The second type of error pattern is different from the first type of error pattern and may identify the second type of uncorrectable errors. For example, the second type of error pattern may indicate that the pre-stored codeword includes uncorrectable errors. As described above, the first type of error pattern may indicate that the main data DQ include uncorrectable errors.

For example, the on-die ECC engine 400, in response to the activated second error flag EF2, may convert the second parity data to a third parity data (replace the second parity data with the third parity data). In some embodiments, the third parity data may be generated by applying the second type of error pattern to the second parity data in the second codeword. The on-die ECC engine 400 may generate the third codeword including the main data DQ and the third parity data. Example embodiments, however, are not limited thereto. In some embodiments, the on-die ECC engine 400 may generate the third codeword by change at least one of bits of the second codeword including the main data DQ and the second parity data based on the second type of error pattern. In some embodiments, the on-die ECC engine 400, in response to the activated second error flag EF2, may apply the second type of error pattern to the first codeword by inverting (flipping) at least one bit of the link parity data LPRT (i.e., the first parity data), or by inverting at least one bit of the first codeword to generate the second codeword. The application of the second type of error pattern to the first codeword means flipping of at least one bit of the link parity data LPRT or inverting at least one bit of the first codeword (i.e., modifying the first codeword to identify that the pre-stored codeword have uncorrectable errors).

The on-die ECC engine 400, in a normal read operation, may perform an ECC decoding on the codeword read from the target page to recover the main data DQ and may provide the main data DQ to the link ECC engine 295. The on-die ECC engine 400 may generate the decoding status flag DSF indicating a status of detected error in the masked write operation, the scrubbing operation, or the normal read operation, and may transmit the decoding status flag DSF to the memory controller 100. In example embodiments, the on-die ECC engine 400 may perform on the ECC decoding on the codeword read from the target page in a memory operation on the target page. The memory operation may include one of a read-modify-write operation on the target page; a scrubbing operation on the target page and a read-modify-write operation on the target page; and a read operation on the target page performed after a scrubbing operation on the target page of the semiconductor memory device 200.

The link ECC engine 295 may perform a link ECC encoding on the main data DQ to generate the link parity data LPRT and may transmit the first codeword CW1 including the main data DQ and the link parity data LPRT to the memory controller 100.

That is, the link ECC engine 295 codes the main data DQ to generate the first codeword CW1 and transmits the first codeword CW1 to the memory controller 100.

Figure 2:
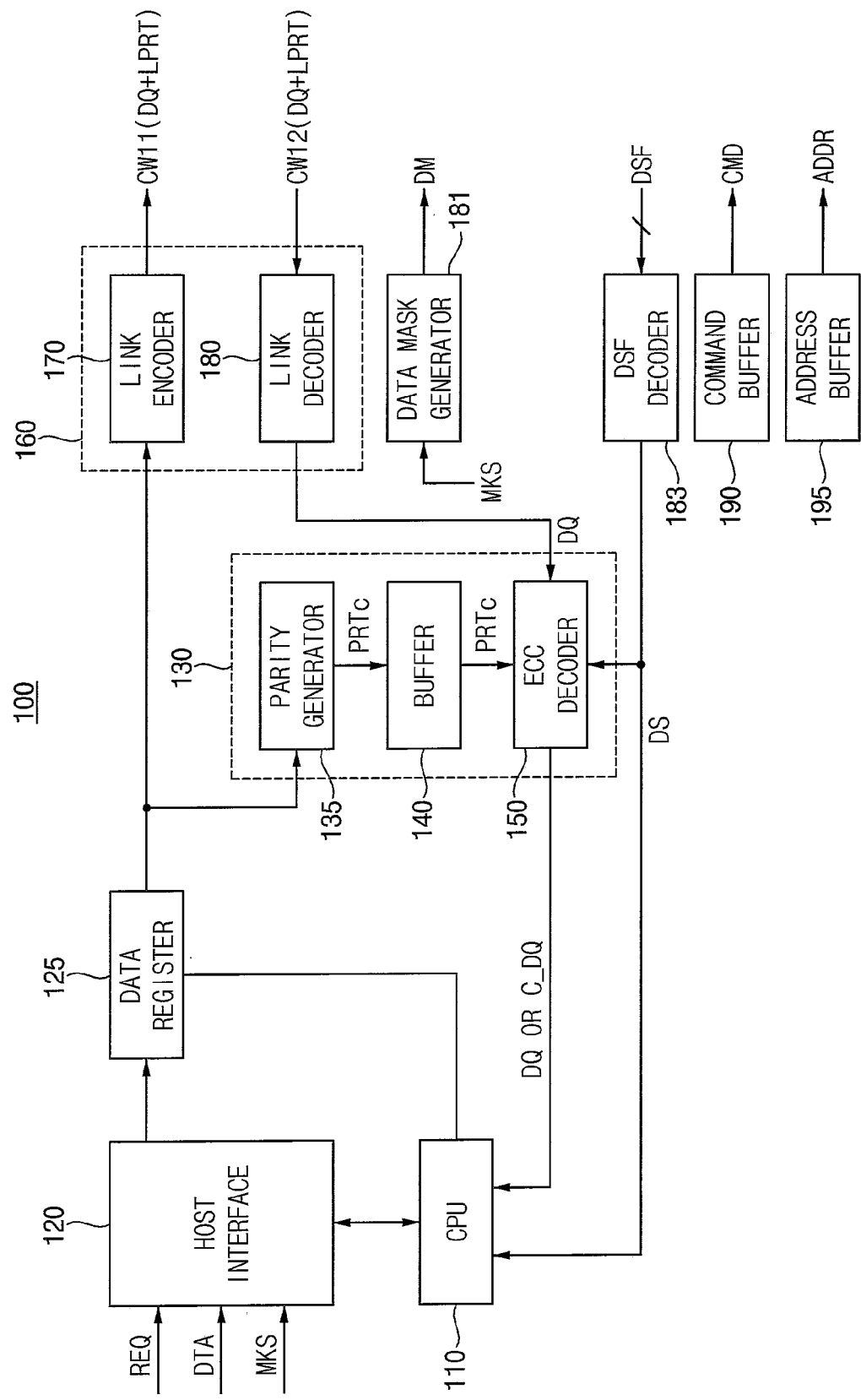
FIG. 2 is block diagram illustrating the memory controller in the memory system of FIG. 1 according to example embodiments.

FIG. 2 is block diagram illustrating the memory controller in the memory system of FIG. 1 according to example embodiments.

Referring to FIG. 2, the memory controller 100 may include CPU 110, a host interface 120, a data register 125, a system ECC engine 130, the link ECC engine 160, a data mask generator 181, a decoding status flag decoder 183, a command buffer 190 and an address buffer 195. The system ECC engine 130 may include a parity generator 135, a buffer 140 and an ECC decoder 150. The link ECC engine 160 may include a link ECC encoder 170 and a link ECC decoder 180.

The host interface 120 receives a request REQ and data DTA from the host and provides the data DTA to the data register 125. The data register 125 stores the data DTA and continuously (or sequentially) outputs the main data DQ to the parity generator 135 and the link ECC encoder 170.

The link ECC encoder 170 preforms a link ECC encoding on the main data DQ to generate a first codeword CW11 including the main data DQ and the link parity data LPRT.

The parity generator 135 generates a system parity data PRTc based on the main data DQ and stores the system parity data PRTc in the buffer 140.

The decoding status flag decoder 183 decodes the decoding status flag DSF received from the semiconductor memory device 200 and may provide the ECC decoder 150 and the CPU 110 with a decoding signal DS indicating a type of errors in the main data DQ. For the convenience of a description, the main data DQ may represent data to be read in a read operation or data to be written in a write operation. In some embodiments, the decoding status flag decoder 183 may operate in a read operation in which the memory controller 100 may receive data read from the semiconductor memory device 200.

The link ECC decoder 180 performs a link ECC decoding on a first codeword CW12 including the main data DQ and the link parity data LPRT received from the semiconductor memory device 200 to recover the main data DQ and may provide the main data DQ to the ECC decoder 150. The ECC decoder 150 may perform an ECC decoding on the main data DQ and may provide the main data DQ or a corrected main data C-DQ to the CPU 110.

The CPU 110 may receive the decoding signal DS and the main data DQ or the corrected main data C_DQ and may determine how to process the main data DQ or the corrected main data C_DQ based on the decoding signal DS.

The command buffer 190 stores the command CMD corresponding to the request REQ and transmits the command CMD to the semiconductor memory device 200 under control of the CPU 110. The address buffer 195 stores the address ADDR and transmits the address ADDR to the semiconductor memory device 200 under control of the CPU 110.

Figure 3:
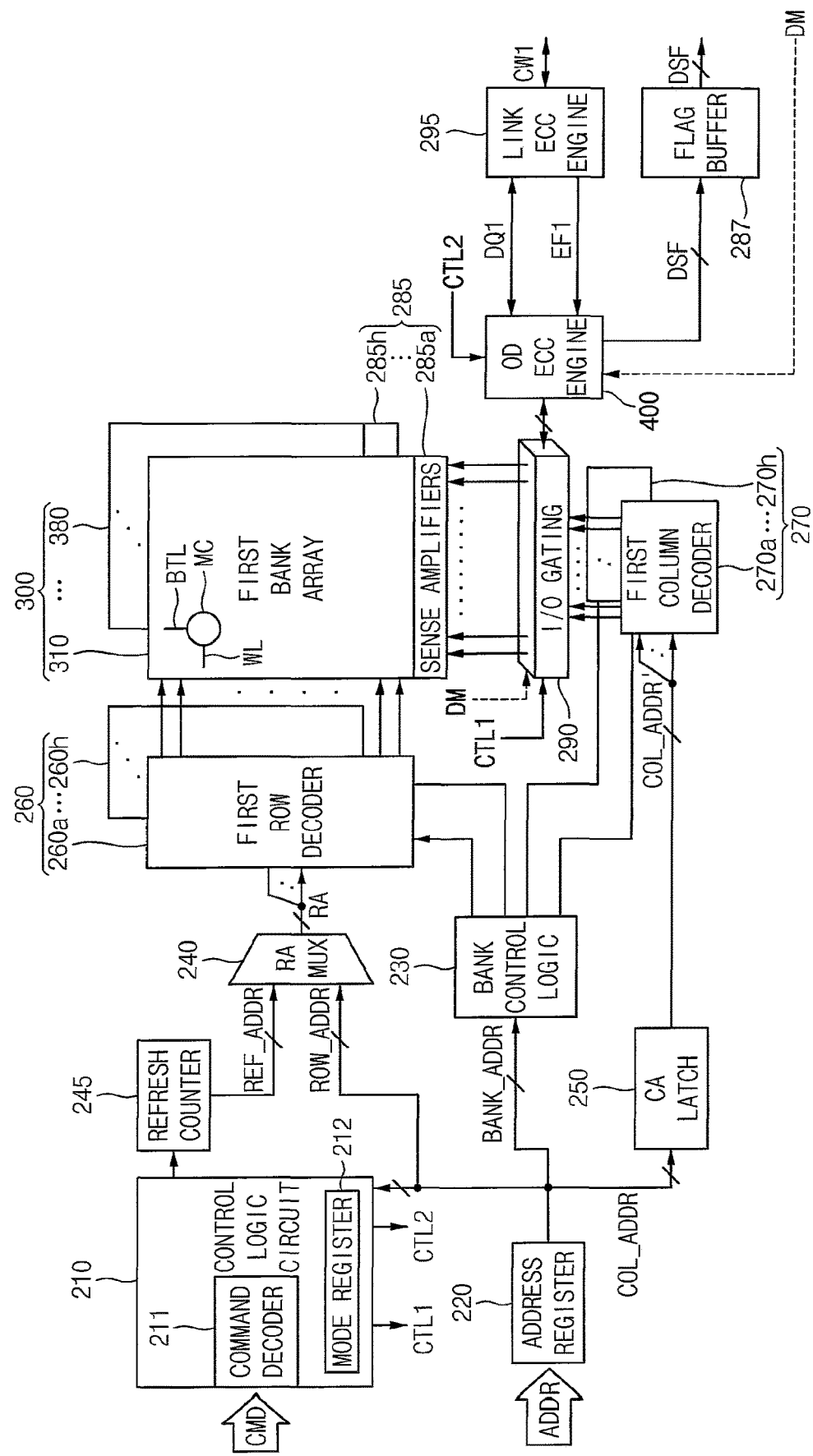
FIG. 3 is a block diagram illustrating an example of the semiconductor memory device in the memory system of FIG. 1 according to example embodiments.

FIG. 3 is a block diagram illustrating an example of the semiconductor memory device in the memory system of FIG. 1 according to example embodiments.

Referring to FIG. 3, a semiconductor memory device 200a may include a control logic circuit 210, an address register 220, a bank control logic 230, a row address multiplexer 240, a column address latch 250, a row decoder 260, a column decoder 270, a memory cell array 300, a sense amplifier unit 285, an input/output (I1O) gating circuit 290, a data input/output (I1O) buffer, a refresh counter 245, the on-die ECC engine 400, the link ECC engine 295 and a flag buffer 287.

The memory cell array 300 may include first through eighth bank arrays 310~380. The row decoder 260 may include first through eighth bank row decoders 260a~260h respectively coupled to the first through eighth bank arrays 310~380, the column decoder 270 may include first through eighth bank column decoders 270a~270h respectively coupled to the first through eighth bank arrays 310~380, and the sense amplifier unit 285 may include first through eighth bank sense amplifiers 285a~285h respectively coupled to the first through eighth bank arrays 310~380.

The first through eighth bank arrays 310~380, the first through eighth bank row decoders 260a~260h, the first through eighth bank column decoders 270a~270h and first through eighth bank sense amplifiers 285a~285h may form first through eighth banks. Each of the first through eighth bank arrays 310~380 may include a plurality of memory cells MC coupled to word-lines WL and bit-lines BTL.

The address register 220 may receive an address ADDR including a bank address BANK_ADDR, a row address ROW_ADDR and a column address COL_ADDR and the command CMD from the memory controller 100.

The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through eighth bank row decoders 260a~260h corresponding to the bank address BANK_ADDR may be activated in response to the bank control signals, and one of the first through eighth bank column decoders 270a~270h corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output one of the row address ROW_ADDR and the refresh row address REF_ADDR as a row address RA. The row address RA that is output from the row address multiplexer 240 may be applied to the first through eighth bank row decoders 260a~260h.

The activated one of the first through eighth bank row decoders 260a~260h may decode the row address RA that is output from the row address multiplexer 240, and may activate a word-line corresponding to the row address RA. For example, the activated bank row decoder may apply a word-line driving voltage to the word-line corresponding to the row address RA.

The column address latch 250 may receive the column address COL_ADDR from the address register 220, and may temporarily store the received column address COL_ADDR. In some embodiments, in a burst mode, the column address latch 250 may generate column addresses COL_ADDR' that increment from the received column address COL_ADDR. The column address latch 250 may apply the temporarily stored or generated column address COL_ADDR' to the first through eighth bank column decoders 270a~270h.

The activated one of the first through eighth bank column decoders 270a~270h may decode the column address COL_ADDR that is output from the column address latch 250, and may control the I/O gating circuit 290 in order to output data corresponding to the column address COL_ADDR.

The I/O gating circuit 290 may include circuitry for gating input/output data. The I/O gating circuit 290 further may include read data latches for storing data that is output from the first through eighth bank arrays 310~380, and write drivers for writing data to the first through eighth bank arrays 310~380.

Codeword CW to be read from one bank array of the first through eighth bank arrays 310~380 may be sensed by a sense amplifier coupled to the one bank array from which the data is to be read, and may be stored in the read data latches. The codeword CW stored in the read data latches is ECC-decoded by the on-die ECC engine 400 and the main data DQ may be provided to the link ECC engine 295 and the link ECC engine 295 may transmit the first codeword CW1 including the main data DQ and the link parity data to the memory controller 100.

The first codeword CW1 to be written in one bank array of the first through eighth bank arrays 310~380 may be provided to the link ECC engine 295 from the memory controller 100. The link ECC engine 295 may perform a first ECC decoding on the first codeword CW1 to provide the main data DQ to the on-die ECC engine 400. The link ECC engine 295 may provide the first error flag EF1 to the on-die ECC engine 400 when the link ECC engine 295 detects the first type of uncorrectable errors in the first codeword CW1 based on a result of the first ECC decoding.

The on-die ECC engine 400 may performs an ECC encoding on the main data DQ to provide the second codeword or the third codeword to the I/O gating circuit 290.

The on-die ECC engine 400, in a scrubbing operation or in a masked write operation, may perform a second ECC decoding on the pre-stored codeword read from the target page, may generate a second error flag and the decoding status flag DSF when the on-die ECC engine 400 detects the second type of uncorrectable errors in the pre-stored codeword based on a result of the second ECC decoding and may transmit the decoding status flag DSF to the memory controller 100 through the flag buffer 287.

The on-die ECC engine 400 may generate the third codeword by applying different error patterns to the second codeword based on the first error flag EF1 and the second error flag and may provide the third codeword to the I/O gating circuit 290.

The flag buffer 287 may receive the decoding status flag DSF and may transmit the decoding status flag DSF to the memory controller 100.

The data mask signal DM may be provided to the on-die ECC engine 400 and the I/O gating circuit 290 may operate a masked write operation based on the data mask signal DM.

The control logic circuit 210 may control operations of the semiconductor memory device 200. For example, the control logic circuit 210 may generate control signals for the semiconductor memory device 200 in order to perform a write operation or a read operation. The control logic circuit 210 may include a command decoder 211 that decodes the command CMD received from the memory controller 100 and a mode register 212 that sets an operation mode of the semiconductor memory device 200.

For example, the command decoder 211 may generate control signals corresponding to the command CMD by decoding a write enable signal, a row address strobe signal, a column address strobe signal, a chip select signal, etc. The control logic circuit 210 may generate a first control signal CTL1 to control the I/O gating circuit 290 and a second control signal CTL2 to control the on-die ECC engine 400.

Figure 4:
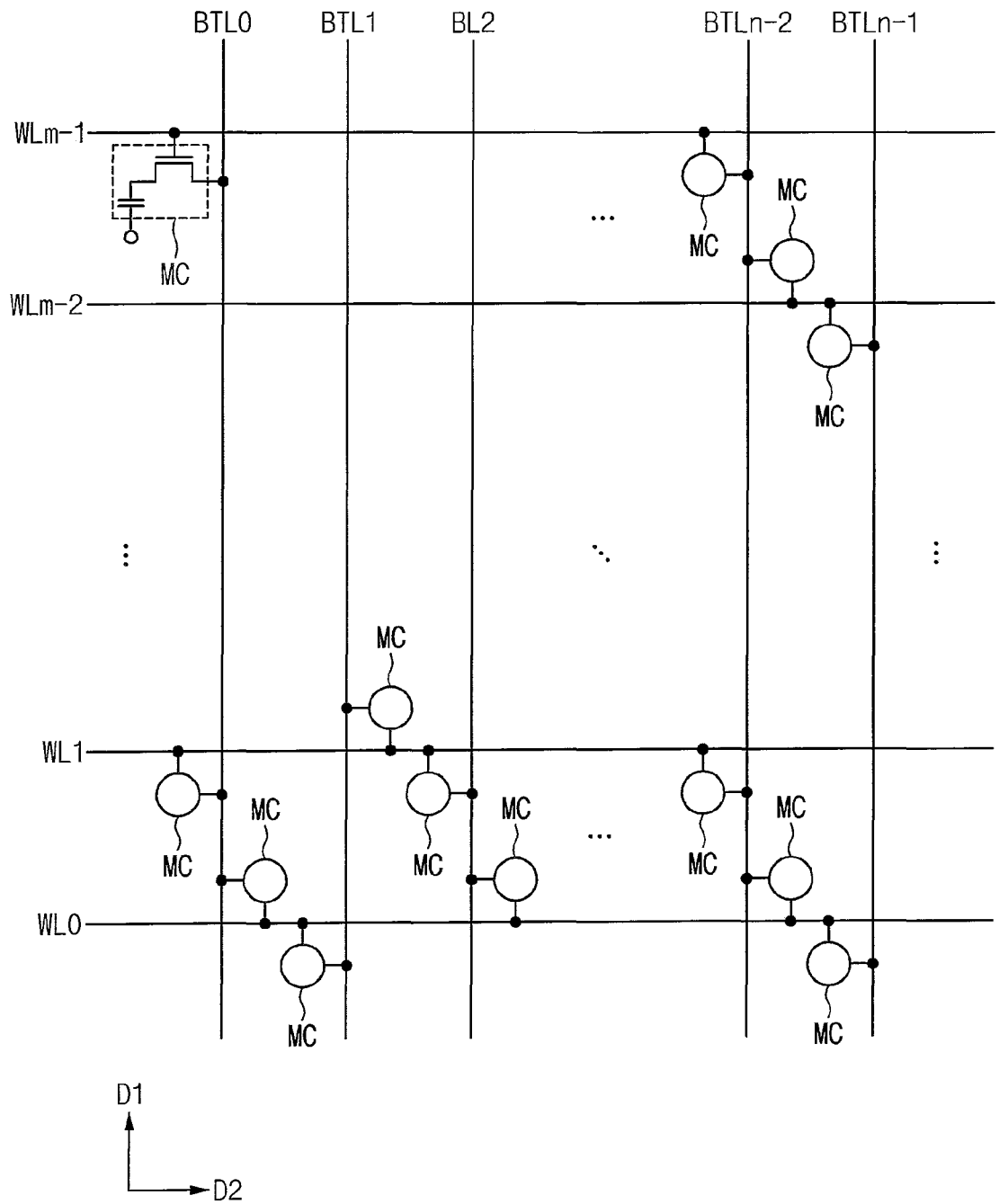
FIG. 4 illustrates an example of the first bank array in the semiconductor memory device of FIG. 3.

FIG. 4 illustrates an example of the first bank array in the semiconductor memory device of FIG. 3.

Referring to FIG. 4, the first bank array 310 includes a plurality of word-lines WL~WLm−1 (where m is an even number equal to or greater than two), a plurality of bit-lines BTL0~BTLn−1 (where n is an even number equal to or greater than two), and a plurality of memory cells MCs disposed at intersections between the word-lines WL0~WLm−1 and the bit-lines BTL0~BTLn−1.

The bit-lines BTL0~BTLn−1 may extend in a first direction D1 and the word-lines WL~WLm−1 may extend in a second direction D2.

Each of the memory cells MCs includes an access (cell) transistor coupled to one of the word-lines WL0~WLm−1 and one of the bit-lines BTL0~BTLn−1 and a storage (cell) capacitor coupled to the cell transistor. That is, each of the memory cells MCs has a DRAM cell structure.

In addition, the memory cells MCs may have different arrangement depending on that the memory cells MCs are coupled to an even word-line (for example, WL0) or an odd word-line (for example, WL1). That is, a bit-line coupled to adjacent memory cells may be different depending on whether a word-line selected by an access address is an even word-line or an odd word-line.

Figure 5:
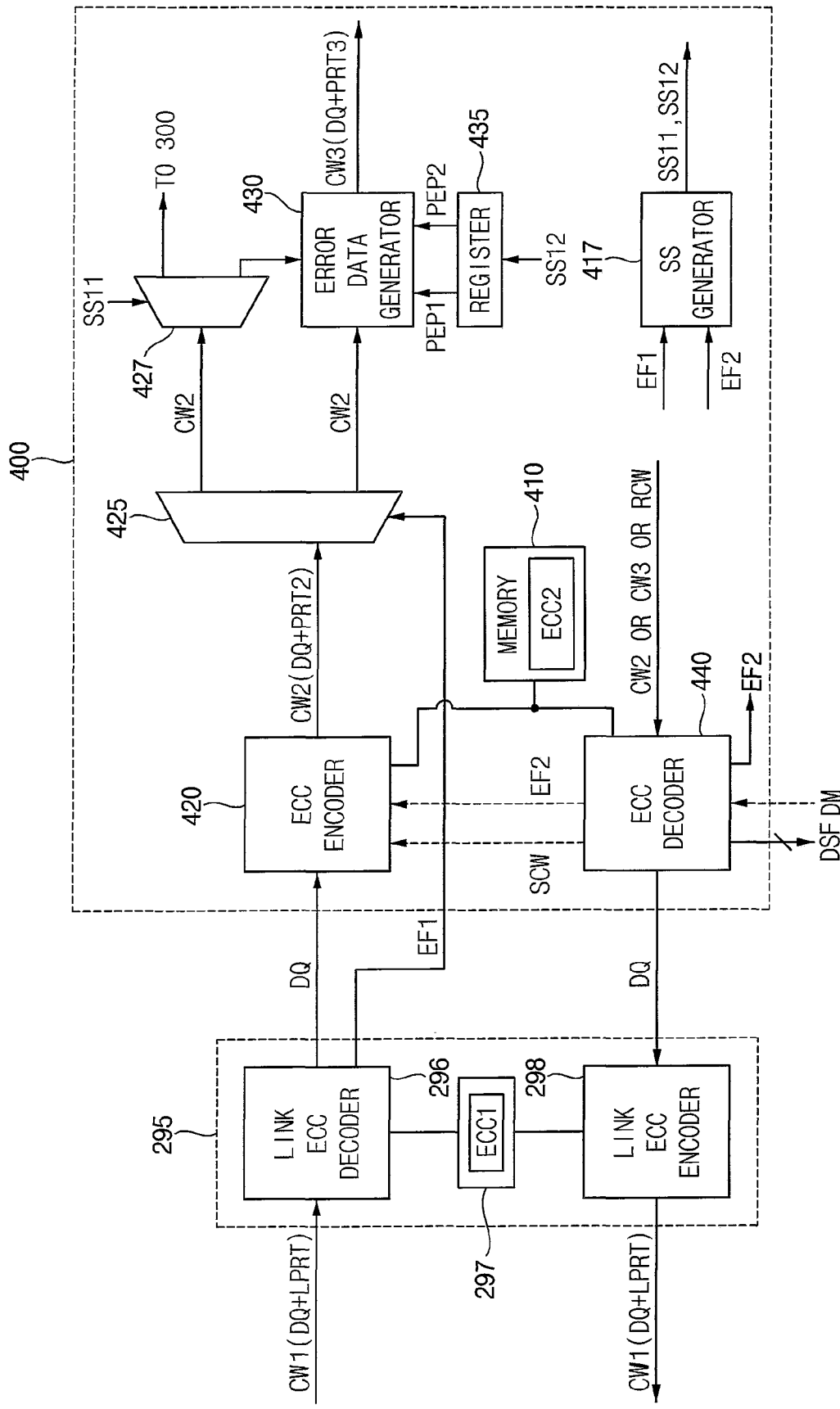
FIG. 5 is a block diagram illustrating a link ECC engine and an on-die ECC engine in the semiconductor memory device of FIG. 3 according to example embodiments.

FIG. 5 is a block diagram illustrating a link ECC engine and an on-die ECC engine in the semiconductor memory device of FIG. 3 according to example embodiments.

Referring to FIG. 5, the link ECC engine 295 may include a link ECC decoder 296, a link ECC encoder 298 and an ECC memory 297.

The ECC memory 297 may store a first ECC ECC1 and may be connected to the link ECC decoder 296 and the link ECC encoder 298. The first ECC ECC1 may be a SECDED code or a CRC code that may correct one error bit and may detect two error bits.

The link ECC decoder 296 may perform a first ECC decoding on the first codeword CW1 including the main data DQ and the link parity data LPRT by using the first ECC ECC1 to provide the main data DQ to the on-die ECC engine 400, may generate the first error flag EF1 that is activated when the link ECC decoder 296 detects the first type of uncorrectable errors (uncorrectable errors occurs during the data is transmitted between the memory controller 100 and the semiconductor memory device) and may provide the first error flag EF1 to the on-die ECC engine 400.

In example embodiment, the main data DQ may include 128 bits and the link parity data LPRT may include 9 bits. In addition, the link parity data LPRT may be referred to as the first parity data.

The link ECC encoder 298 may perform a second ECC encoding on the main data DQ from the on-die ECC engine 400 by using the first ECC ECC1 to generate the link parity data LPRT and may transmit the first codeword CW1 including the main data DQ and the link parity data LPRT to the memory controller 100.

The on-die ECC engine 400 may include an ECC memory 410, an ECC encoder 420, an ECC decoder 440, a first demultiplexer 425, a second demultiplexer 427, an error data generator 430, a register 435 and a selection signal (SS) generator 417.

The ECC memory 410 may store a second ECC ECC2. The ECC encoder 420 and the ECC decoder 440 may be connected to the ECC memory 410. The second ECC ECC2 may be a single error correction (SEC) code for correcting one error bit or a SECDED code.

The ECC encoder 420 may perform a first ECC encoding on the main data DQ to generate a second parity data PRT2 by using the second ECC ECC2 and may provide a second codeword CW2 including the main data DQ and the second parity data PRT2 to the first demultiplexer 425.

In example embodiments, the second parity data PRT2 may include 8 bits.

The first demultiplexer 425 may provide the second codeword CW2 to one of the second demultiplexer 427 and the error data generator 430 based on the first error flag EF1.

The first demultiplexer 425 provides the second codeword CW2 to the second demultiplexer 427 in response to the first error flag EF1 indicating that the main data DQ does not include the first type of uncorrectable errors (i.e., uncorrectable errors of the first type). The first demultiplexer 425 provides the second codeword CW2 to the error data generator 430 in response to the first error flag EF1 indicating that the main data DQ include the first type of uncorrectable errors.

The second demultiplexer 427 may provide the second codeword CW2 to one of the target page and the error data generator 430 based on a first selection signal SS1.

The ECC decoder 440 is connected to the ECC memory 410. The ECC decoder 440 may receive the second codeword CW2 or a third codeword CW3 read from the target page in a normal read operation or a scrubbing operation and may receive a pre-stored codeword RCW read from the target page in a masked write operation.

The ECC decoder 440, in the (normal) read operation, may perform a second ECC decoding on the second codeword CW2 or the third codeword CW3 by using the second ECC ECC2 to recover the main data DQ and may generate the decoding status flag DSF indicating status of errors in the second codeword CW2 or the third codeword CW3.

The ECC decoder 440, in the scrubbing operation, may perform a second ECC decoding on the pre-stored codeword RCW by using the second ECC ECC2, may correct correctable error in the pre-stored codeword RCW, may write back the corrected codeword to the target page, may generate the decoding status flag DSF indicating status of errors in the pre-stored codeword RCW and may generate the second error flag EF2 when the ECC decoder 440 detects the second type of uncorrectable errors in the pre-stored codeword RCW.

The ECC decoder 440, in the masked write operation, may perform a second ECC decoding on the pre-stored codeword RCW by using the second ECC ECC2, may correct correctable error in the pre-stored codeword RCW, may provide a selectively corrected data SCW to the ECC encoder 420, may generate the second error flag EF2 when the ECC decoder 440 detects the second type of uncorrectable errors and may provide the second error flag EF2 to the ECC encoder 420 and the selection signal generator 417. For example, the ECC decoder 440, in the mask write operation, may perform the second ECC decoding on the pre-stored codeword RCW by using the second ECC ECC2. When the pre-stored codeword RCW has correctable errors, the ECC decoder 440 may correct the correctable errors to generate a selectively corrected data SCW. The ECC decoder 440 may provide the selectively corrected data SCW to the ECC encoder 420. When the pre-stored codeword RCW has uncorrectable errors of the second type, the ECC decoder 440 may detect the uncorrectable errors of the second type, and generate the second error flag EF2. The ECC decoder 440 may provide the second error flag EF2 to the ECC encoder 420 and the selection signal generator 417.

The ECC encoder 420, in the masked write operation, may generate the second parity data PRT2 based on the main data DQ and the selectively corrected data SCW and may provide the main data DQ and the second parity data PRT2 to the first demultiplexer 425.

The selection signal generator 471 may generate the first selection signal SS11 and a second selection signal SS12 based on the first error flag EF1 and the second error flag EF2, may provide the first selection signal SS11 to the second demultiplexer 427 and may provide the second selection signal SS12 to the register 435.

The second demultiplexer 427, in a write operation, may provide the second codeword CW2 to the target page based on the first selection signal SS11 when the main data DQ does not include the first type of uncorrectable errors. The second demultiplexer 427, in the scrubbing operation or the masked write operation, may provide the second codeword CW2 to error data generator 430 based on the first selection signal SS11 when the pre-stored codeword RCW includes the second type of uncorrectable errors. In some embodiment, the first selection signal SS11 may have a first logic level when the main data DQ does not include the first type of uncorrectable errors, and the first selection signal SS11 may have a second logic level when the pre-stored codeword RCW includes the second type of uncorrectable errors.

The register 435 may store a first type of error pattern PEP1 and a second type of error pattern PEP2 and may provide an error pattern signal representing one of the first type of error pattern PEP1 and the second type of error pattern PEP2 to the error data generator 430 based on the second selection signal SS12. The reference PEP1 may also indicate a first error pattern signal representing the first type of error pattern, and the reference PEP2 may also indicate a second error pattern signal representing the second type of error pattern.

The register 435 may provide the first type of error pattern PEP1 to the error data generator 430 in response to the second selection signal SS12 when the first error flag EF1 indicates that the first type of uncorrectable errors occur in the main data DQ. The register 435 may provide the second type of error pattern PEP2 to the error data generator 430 in response to the second selection signal SS12 when the second error flag EF2 indicates that the second type of uncorrectable errors occur in the pre-stored codeword RCW.

The error data generator 430 may apply one of the first type of error pattern PEP1 and the second type of error pattern PEP2 to the second parity data PRT2 to generate the third parity data PRT3, may replace the second parity data PRT2 with the third parity data PRT3 to generate the third codeword CW3 and may provide the codeword CW3 including the main data DQ and the third parity data PRT3 to the target page.

Example embodiments, however, are not limited thereto. In some embodiments, the error data generator 430 may generate the third codeword CW3 by changing at least one of bits of the second codeword CW2 based on one of the first type of error pattern PEP1 and the second type of error pattern PEP2 and may provide the third codeword CW3 to the target page.

Although it is described that the ECC encoder 420 and the ECC decoder 440 are coupled to the ECC memory 410 to use the second ECC ECC2, the second ECC ECC2 may be implemented with exclusive OR gates within the ECC encoder 420 and the ECC decoder 440.

Figure 6:
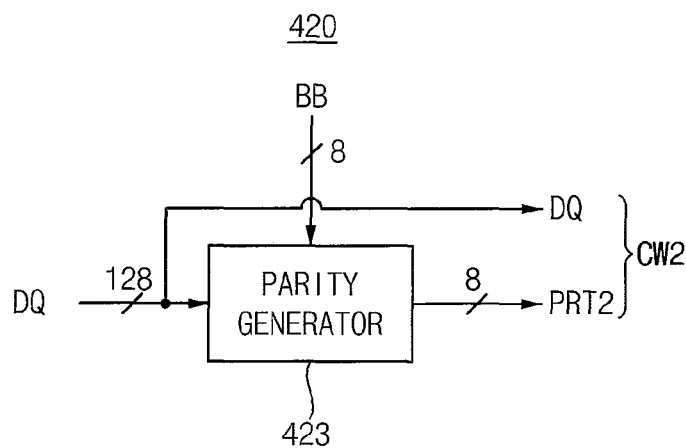
FIG. 6 illustrates an example of the ECC encoder in the on-die ECC engine of FIG. 5 according to example embodiments.

FIG. 6 illustrates an example of the ECC encoder in the on-die ECC engine of FIG. 5 according to example embodiments.

Referring to FIG. 6, the ECC encoder 420 may include a parity generator 423. The parity generator 423 receives 128-bit write data WDQ and 8-bit basis bit BB and generates the 8-bit parity bits PRT by performing, for example, an XOR array operation. The basis bit BB is bits for generating the parity bits PRT with respect to the 128-bit write data WDQ and may include b'0000000. The basis bit BB may include other particular bits instead of b'0000000.

Figure 7:
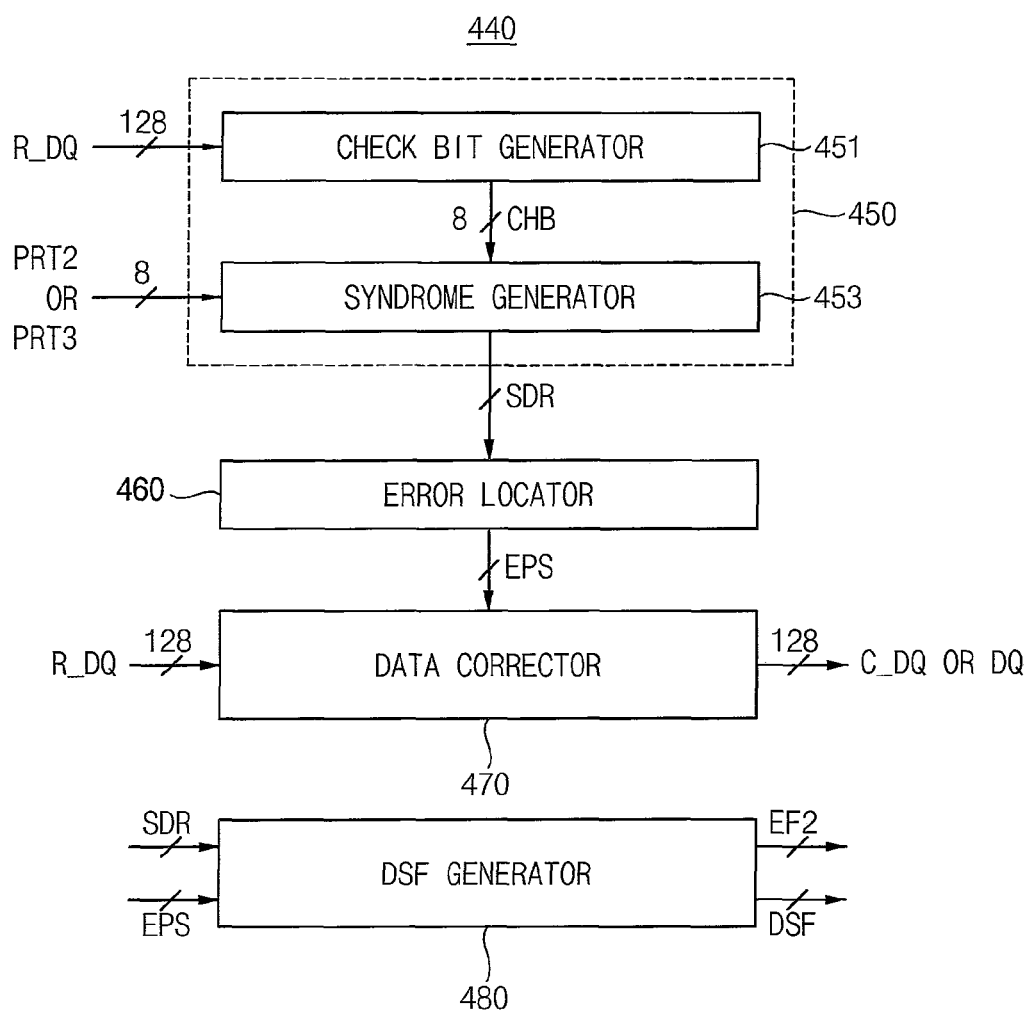
FIG. 7 illustrates an example of the ECC decoder in the on-die ECC engine of FIG. 5 according to example embodiments.

FIG. 7 illustrates an example of the ECC decoder in the on-die ECC engine of FIG. 5 according to example embodiments.

Referring to FIG. 7, the ECC decoder 440 may include a syndrome generation circuit 450, an error locator 460, a data corrector 470 and a decoding status flag generator 480. The syndrome generation circuit 450 may include a check bit generator 451 and a syndrome generator 453.

The check bit generator 451 generates check bits CHB based on the read data R_DQ by performing an XOR array operation, and the syndrome generator 453 generates a syndrome SDR by comparing corresponding bits of the second parity data PRT2 or the third parity data PRT3 and the check bits CHB.

The error locator 460 generates an error position signal EPS indicating a position of an error bit in the read data R_DQ to provide the error position signal EPS to the data corrector 470 and the decoding status flag generator 480 when all bits of the syndrome SDR are not 'zero'.

The data corrector 470 receives the read data R_DQ, corrects the error bit in the read data R_DQ based on the error position signal EPS when the read data RD_Q include the error bit and outputs the corrected main data C_DQ. The data corrector 470 may output the main data DQ when the read data RD_Q include no error.

The decoding status flag generator 480 may generate the second error flag signal EF2 that is activated when the read data R_DQ include the second type of uncorrectable errors and may generate the decoding status flag DSF indicating status of error in the read data RD_Q, based on the syndrome SDR and the error position signal EPS.

Figure 8:
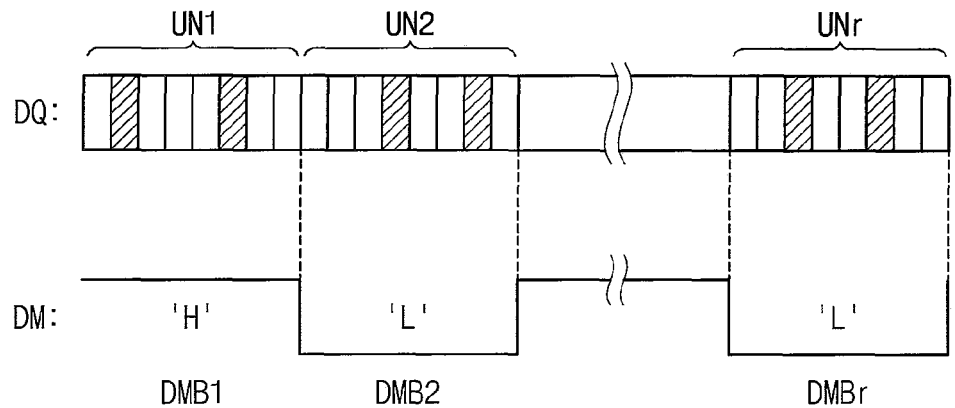
FIGS. 8 and 9 illustrate the main data and the data mask signal.
Figure 9:
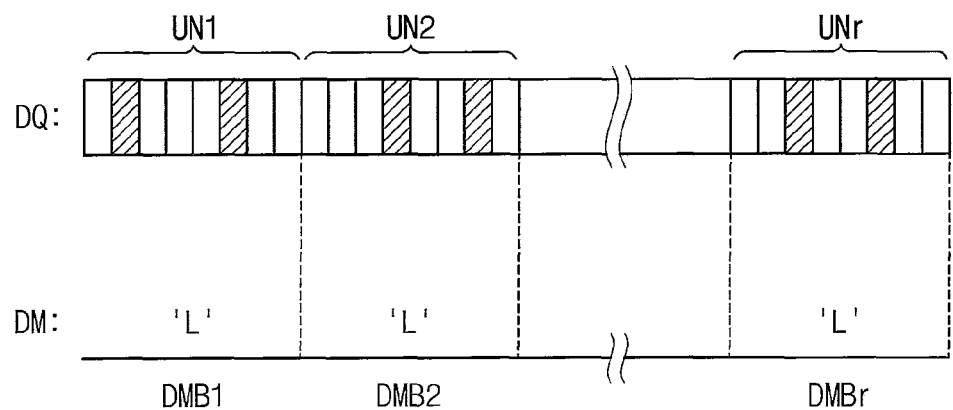

FIGS. 8 and 9 illustrate the main data and the data mask signal.

Referring to FIG. FIGS. 8 and 9, the main data MD include a plurality of unit data UN1~UNr (r is a natural number greater than two) and each of the unit data UN1~UNr includes a plurality of data bits. The data mask signal DM includes a plurality of mask bits DMB1~DMBr corresponding to the plurality of unit data UN1~UNr, respectively. Each of the mask bits DMB1~DMBr may indicate whether to write corresponding one of the unit data UN1~UNr. A mask bit having a first logic level, of the mask bits DMB1~DMBr indicates that a corresponding unit data is masked. As illustrated in FIG. 8, if at least one of the mask bits DMB1~DMBr has a first logic level, a masked write operation is performed on the main data MD. As illustrated in FIG. 9, if all of the mask bits DMB1~DMBr have a second logic level, a normal write operation is performed on the main data MD.

Figure 10:
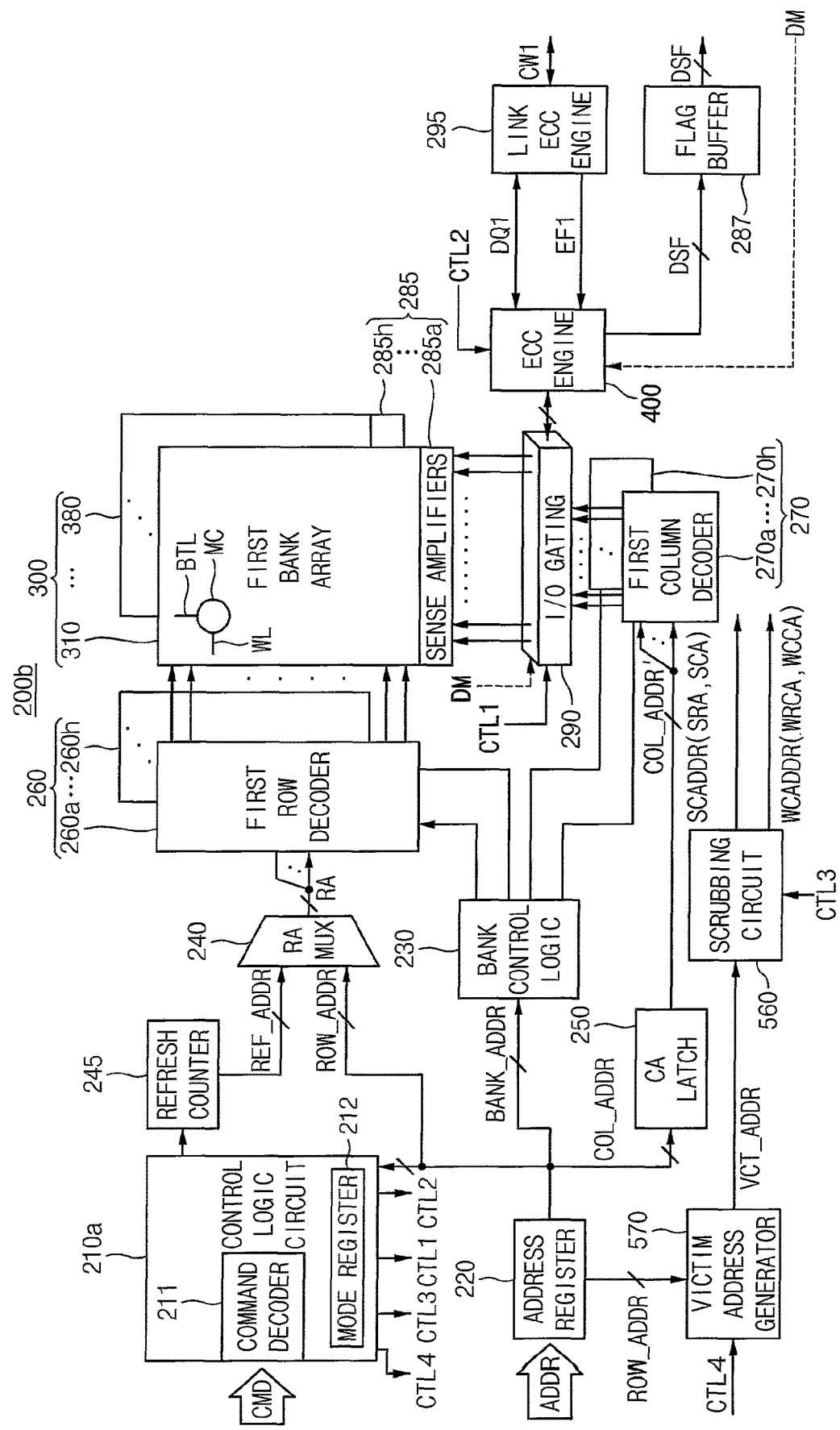
FIG. 10 is a block diagram illustrating another example of the semiconductor memory device in the memory system of FIG. 1 according to example embodiments.

FIG. 10 is a block diagram illustrating an example of the semiconductor memory device in the memory system of FIG. 1 according to example embodiments.

A semiconductor memory device 200b of FIG. 10 differs from the semiconductor memory device 200 in that the semiconductor memory device 200b further includes a scrubbing circuit 560 and a victim address generator 570 and a control logic circuit 210a further controls the scrubbing circuit 560 and the victim address generator 570.

Referring to FIG. 10, the control logic circuit 210a may generate a third control signal CTL3 to control the scrubbing circuit 560 and a fourth control signal CTL4 to control the victim address generator 570.

The victim address generator 570 may count a number of accesses to a first memory region in the memory cell array 300 to generate at least one victim address VCT_ADDR designating at least one adjacent memory region adjacent to the first memory region when the number of the counted accesses reaches the reference number of times during a reference interval. The victim address VCT_ADDR may be stored in an address storing table of the scrubbing circuit 560.

The scrubbing circuit 560, in a first scrubbing mode, may count the refresh row address REF_ADDR which sequentially changes and may output a normal scrubbing address SCADDR whenever the scrubbing circuit 560 counts M refresh row addresses. Here, M is a natural number equal to or greater than two. The normal scrubbing address SCADDR may include a scrubbing row address SRA and a scrubbing column address SCA. The scrubbing circuit 560 may provide the scrubbing row address SRA and the scrubbing column address SCA to the row decoder 260 and the column decoder 270, respectively.

The scrubbing circuit 560, in a second scrubbing mode, may output an address of codeword associated with the victim address VCT_ADDR stored in an address storing table therein as a weak codeword address WCADDR. The weak codeword address WCADDR may include a weak codeword row address WCRA and a weak codeword column address WCCA. The scrubbing circuit 560 may provide the weak codeword row address WCRA and the weak codeword column address WCCA to the row decoder 260 and the column decoder 270, respectively in the second scrubbing mode.

FIG. 11 illustrates an example operation of the error data generator in the on-die ECC engine of FIG. 5 according to example embodiments.

Referring to FIG. 11, when the first type of uncorrectable errors is detected in the main data DQ in a normal write operation or a masked write operation, the error data generator 430 may generate a third codeword CW31 including the main data DQ and a third parity data PRT31 by performing an exclusive OR operation on the second codeword CW2 including the main data DQ and the second parity data PRT2 and data set including default data DFDQ having zero bits and the first type of error pattern PEP1. In some embodiments, the data set may be formed of the default data DFDQ and the first type of error pattern PEP1, each bit of the default data DFDQ being zero.

FIG. 12 illustrates that the third parity data is generated in FIG. 11.

Referring to FIG. 12, the error data generator 430 generates the third parity data PRT31 by performing an exclusive OR operation on the second parity data PRT2 and the first type of error pattern PEP1.

FIG. 13 illustrates that the syndrome is generated based on the third codeword in FIG. 11.

Referring to FIG. 13, a syndrome SDR21 may be generated by performing an exclusive OR operation on the third parity data PRT31 and the first type of error pattern PEP1. Because the third parity data PRT31 is generated by performing an exclusive OR operation on the second parity data PRT2 and the first type of error pattern PEP1, the syndrome SDR21 matches the first type of error pattern PEP1. For example, the syndrome SDR21 may indicate whether the main data of the third codeword CW31 include the first type of error pattern PEP1. Accordingly, when a syndrome generated based on a result of the second ECC decoding matches the first type of error pattern PEP1, the ECC decoder 440 determines that the main data DQ include the first type of uncorrectable errors.

FIG. 14 illustrates an example operation of the error data generator in the on-die ECC engine of FIG. 5 according to example embodiments.

Referring to FIG. 14, when the second type of uncorrectable errors due to memory cells is detected in the main data DQ in a normal write operation or a masked write operation, the error data generator 430 may generate a third codeword CW32 including the main data DQ and a third parity data PRT32 by performing an exclusive OR operation on the second codeword CW2 including the main data DQ and the second parity data PRT2 and data set including default data DFDQ having zero bits and the second type of error pattern PEP2. Each bit of the default data DFDQ may be zero. In some embodiments, the data set may be formed of the default data DFDQ and the second type of error pattern PEP2.

FIG. 15 illustrates that the third parity data is generated in FIG. 14.

Referring to FIG. 15, the error data generator 430 generates the third parity data PRT32 by performing an exclusive OR operation on the second parity data PRT2 and the second type of error pattern PEP2.

FIG. 16 illustrates that the syndrome is generated based on the third codeword in FIG. 14.

Referring to FIG. 16, a syndrome SDR22 may be generated by performing an exclusive OR operation on the third parity data PRT32 and the second type of error pattern PEP2. Because the third parity data PRT32 is generated by performing an exclusive OR operation on the second parity data PRT2 and the second type of error pattern PEP2, the syndrome SDR22 matches the second type of error pattern PEP2. For example, the syndrome SDR22 may indicate whether the main data of the third codeword CW32 include the second type of error pattern PEP2. Accordingly, when a syndrome generated based on a result of the second ECC decoding matches the second type of error pattern PEP2, the ECC decoder 440 determines that the main data DQ include the second type of uncorrectable errors.

In addition, because the first type of error pattern PEP1 and the second type of error pattern PEP2 are different from each other, the ECC decoder 440 may identify a type of uncorrectable errors detected in the read codeword based on the syndrome obtained by the second ECC decoding in a normal read operation or the scrubbing operation. When the read codeword includes the first type of uncorrectable errors, the syndrome matches the first type of error pattern PEP1. When the read codeword includes the second type of uncorrectable errors, the syndrome matches the second type of error pattern PEP2. The ECC decoder 440 may identify a type of uncorrectable errors detected in the read codeword based on the syndrome obtained by the second ECC decoding.

Figure 17:
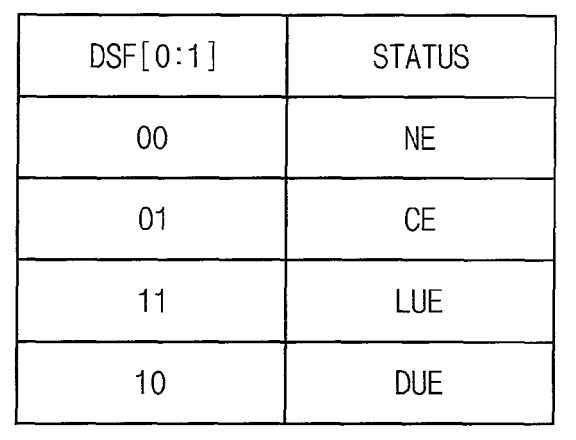

FIG. 17 illustrates the decoding status flag and status of error of the main data in the on-die ECC engine of FIG. 5.

In FIG. 17, it is assumed that the decoding status flag DSF includes two bits.

Referring to FIG. 17, when the decoding status flag DSF corresponds to '00', the decoding status flag DSF indicates that the main data DQ include no errors, which corresponds to 'NE'. When the decoding status flag DSF corresponds to '01', the decoding status flag DSF indicates that the main data DQ include a correctable error, which corresponds to 'CE'. When the decoding status flag DSF corresponds to '11', the decoding status flag DSF indicates that the main data DQ include the first type of uncorrectable errors, which corresponds to 'LUE'. When the decoding status flag DSF corresponds to '10', the decoding status flag DSF indicates that the main data DQ include the second type of uncorrectable errors, which corresponds to 'DUE'.

The decoding status flag generator 480 in FIG. 7 identifies a type of error in the main data DQ based on the syndrome SDR and the error position signal EPS and may determine logic levels of the decoding status flag DSF based on the identified type.

Figure 18:
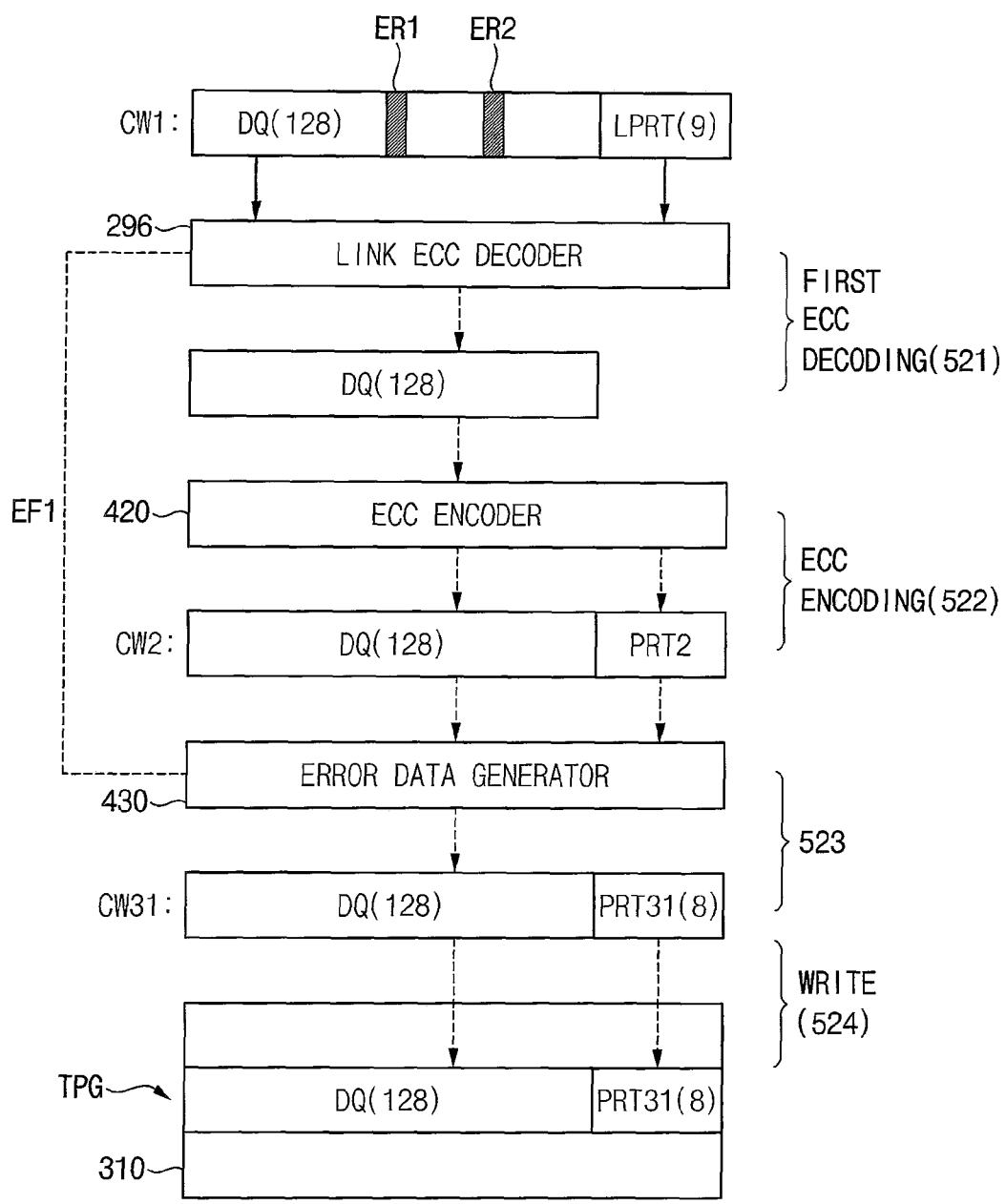
FIG. 18 illustrates that the semiconductor memory device of FIG. 3 performs a normal write operation.

FIG. 18 illustrates that the semiconductor memory device of FIG. 3 performs a normal write operation.

Referring to FIGS. 3, 5 and 18, when the command CMD is a normal write command, the link ECC decoder 296 receives the first codeword CW1 including the main data DQ and the link parity data LPRT from the memory controller 100. In FIG. 18, it is assumed that the main data DQ include a first error bit ER1 and a second error bit ER2.

The link ECC decoder 296 performs a first ECC decoding 521 on the main data DQ based on the link parity data LPRT to provide the main data DQ to the ECC encoder 420. Because the main data DQ include the first error bit ER1 and the second error bit ER2 and the link ECC decoder 296 uses a SECDED code, the link ECC decoder 296 activates the first error flag EF1 indicating that the first type of uncorrectable errors occurs.

The ECC encoder 420 performs an ECC encoding 522 on the main data DQ to generate the second parity data PRT2 and provides the second codeword CW2 including the main data DQ and the second parity data PRT2 to the error data generator 430.

Because the first error flag EF1 is activated, the error data generator 430 generates the third parity data PRT31 by applying the first type of error pattern to the second codeword CW2 as a reference numeral 523 indicates and provides the third codeword CW31 including the main data DQ and the third parity data PRT31 to the I/O gating circuit 290. The I/O gating circuit 290 writes the third codeword CW31 to a target page TPG of the first bank array 310 as a reference numeral 524 indicates.

Figure 19:
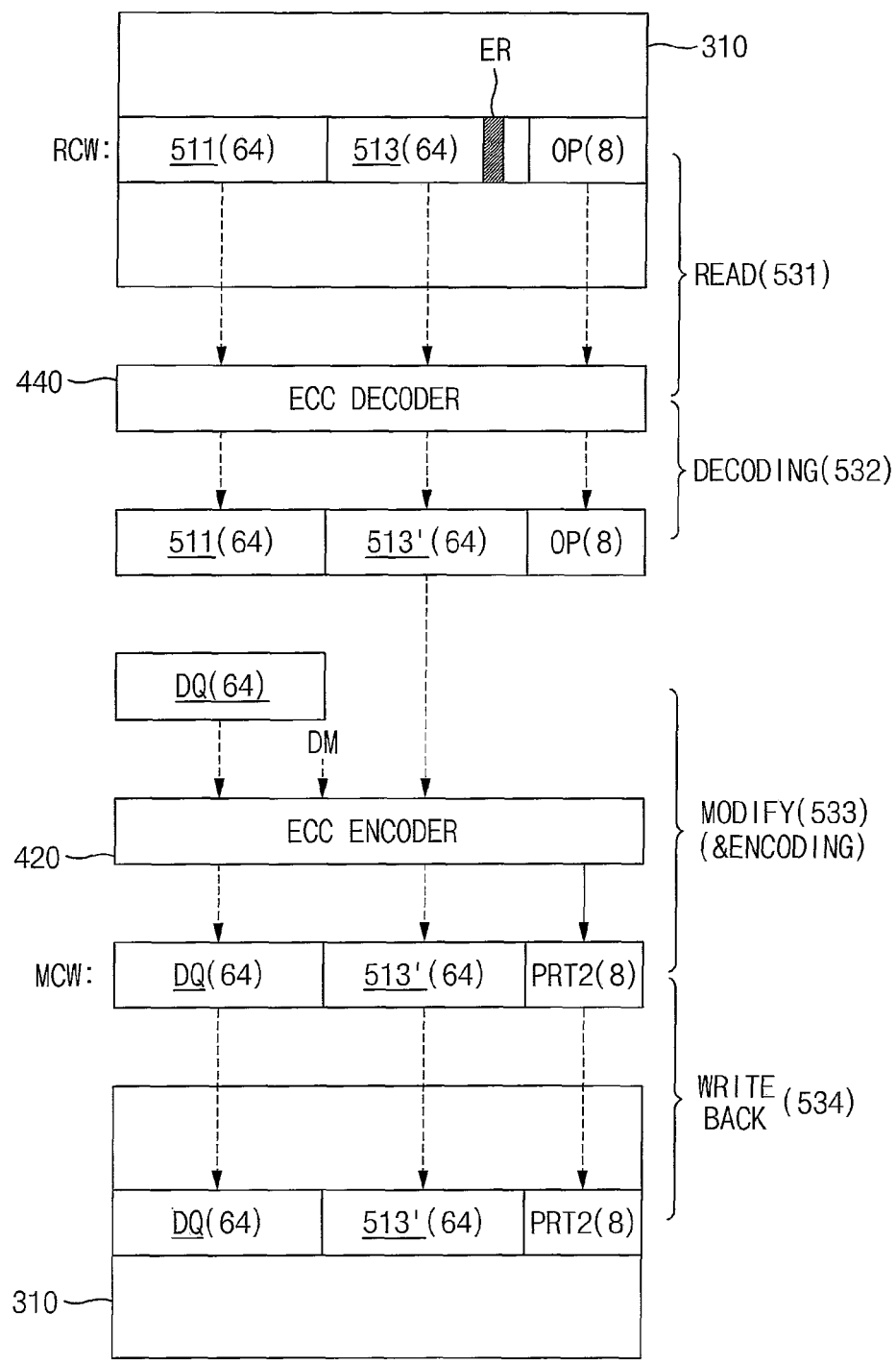
FIG. 19 illustrates that the semiconductor memory device of FIG. 3 performs a masked write operation.

FIG. 19 illustrates that the semiconductor memory device of FIG. 3 performs a masked write operation.

Referring to FIGS. 3, 5 and 19, when the command CMD is a masked write command, a first unit of codeword RCW including a 64-bit first sub unit of data 511, a 64-bit second sub unit of data 513 and a 8-bit parity data OP are read from the sub-page of a page in the first bank array 310, and the first unit of codeword RCW is provided to the ECC decoder 440 as a reference numeral 531 indicates. For the sake of discussion, it is assumed that the second sub unit of data 513 may include an error bit ER.

The ECC decoder 440 performs an ECC decoding on the first unit of codeword RCW, corrects the error bit ER in the second sub unit of data 513 and provides the corrected second sub unit of data 513' to the ECC encoder 420 as a reference numeral 532 indicates.

The ECC encoder 420 also receives the 64-bit write main data DQ and the data mask signal DM, performs an ECC encoding based on the write main data DQ, the data mask signal DM and the corrected second sub unit of data 513' to generate the second parity data PRT2 and provides the I/O gating circuit 290 with a modified codeword MCW including the write main data DQ, the corrected second sub unit of data 513' and the second parity data PRT2 as a reference numeral 533 indicates. When the ECC encoder 420 generates the second parity data PRT2, the ECC encoder 420 modifies the second parity data PRT2 based on the syndrome data SDR and the data mask signal DM because a memory location corresponding to the second sub unit 513 is different from a memory location in which the write main data DQ is to be written.

The I/O gating circuit 290 writes the write main data DQ, the corrected second sub unit of data 513' and the second parity data PRT2 to a sub page of the target page as a reference numeral 534.

Figure 20:
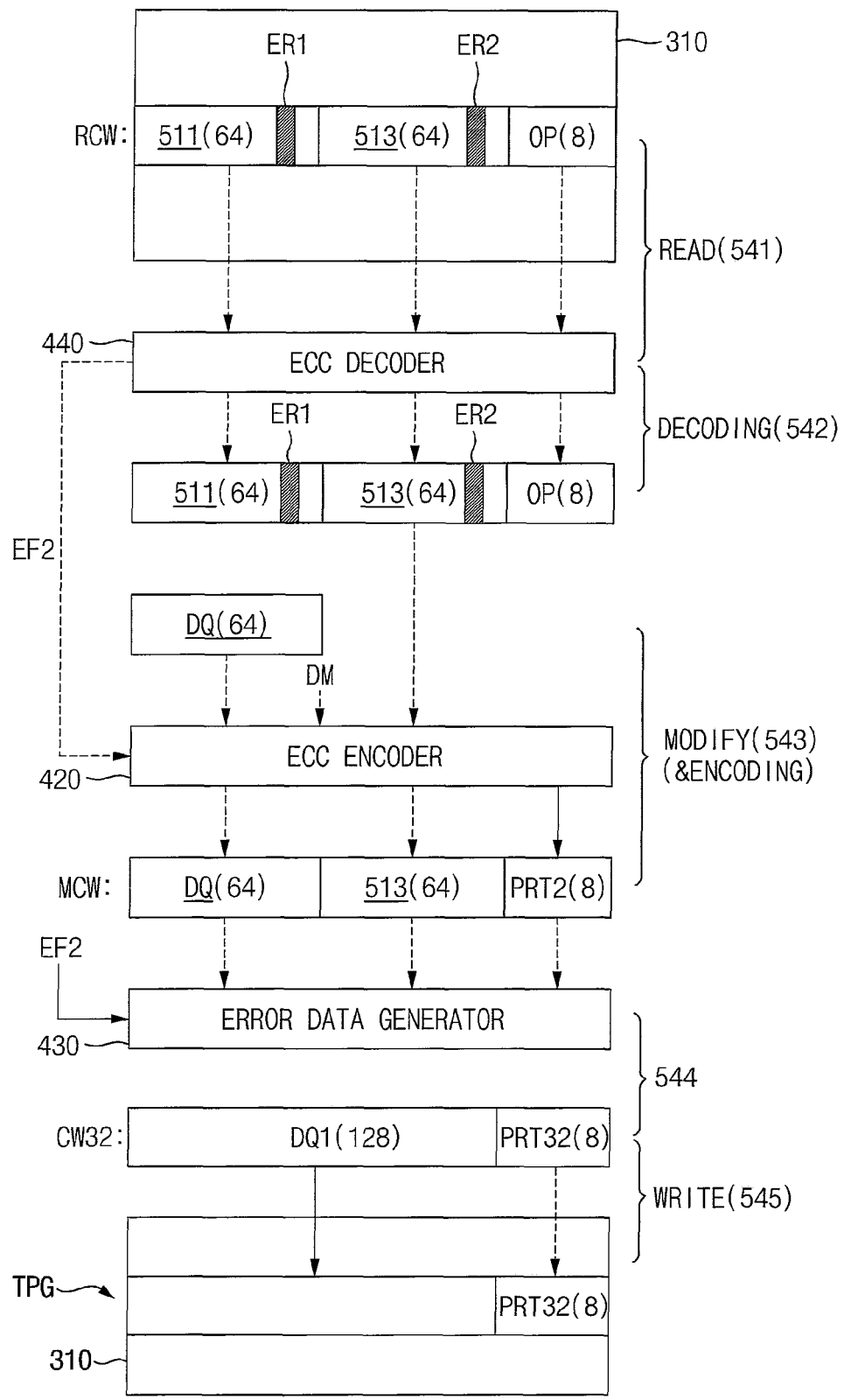
FIG. 20 illustrates that the semiconductor memory device of FIG. 3 performs a masked write operation.

FIG. 20 illustrates that the semiconductor memory device of FIG. 3 performs a masked write operation.

Referring to FIGS. 3, 5 and 20, when the command CMD is a masked write command, a first unit of codeword RCW including a 64-bit first sub unit of data 511, a 64-bit second sub unit of data 513 and a 8-bit parity data OP are read from the sub-page of a page in the first bank array 310 and the first unit of codeword RCW is provided to the ECC decoder 440 as a reference numeral 541 indicates. The first sub unit of data 511 includes an error bit ER1 and the second sub unit of data 513 may include an error bit ER2.

The ECC decoder 440 performs an ECC decoding on the first unit of codeword RCW, and provides first unit of codeword RCW to the ECC encoder 420. Because the first unit of codeword RCW includes uncorrectable errors as a reference numeral 542 indicates, the ECC decoder 440 activates the second error flag EF2 and provides the second error flag EF2 indicating the second type of uncorrectable errors occurs to the error data generator 430.

The ECC encoder 420 also receives the 64-bit write main data DQ and the data mask signal DM, performs an ECC encoding based on the write main data DQ, the data mask signal DM and the second sub unit of data 513 to generate the second parity data PRT2 and provides the error data generator 430 with a modified codeword MCW including the write main data DQ, the second sub unit of data 513 and the second parity data PRT2 as a reference numeral 543 indicates.

Because the first unit of codeword RCW that is pre-stored in the target page includes the second type of uncorrectable errors, the error data generator 430 generates the third parity data PRT32 by applying the second type of error pattern to the second codeword CW2 as a reference numeral 544 indicates and provides the third codeword CW32 including a main data DQ1 and the third parity data PRT32 to the I/O gating circuit 290 as a reference numeral 544 indicates. The I/O gating circuit 290 writes the third codeword CW32 to a target page TPG of the first bank array 310 as a reference numeral 545.

Figure 21:
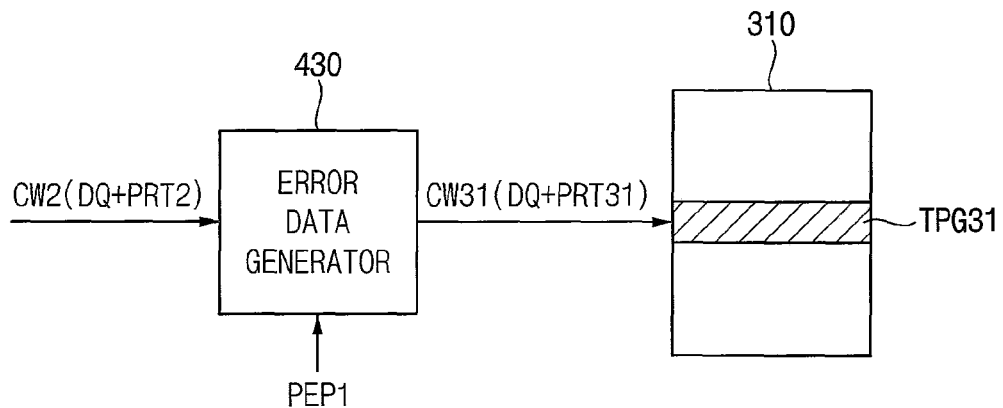
FIGS. 21 and 22 illustrate operations of the error data generator in the on-die ECC engine of FIG. 5, respectively, according to example embodiments.
Figure 22:
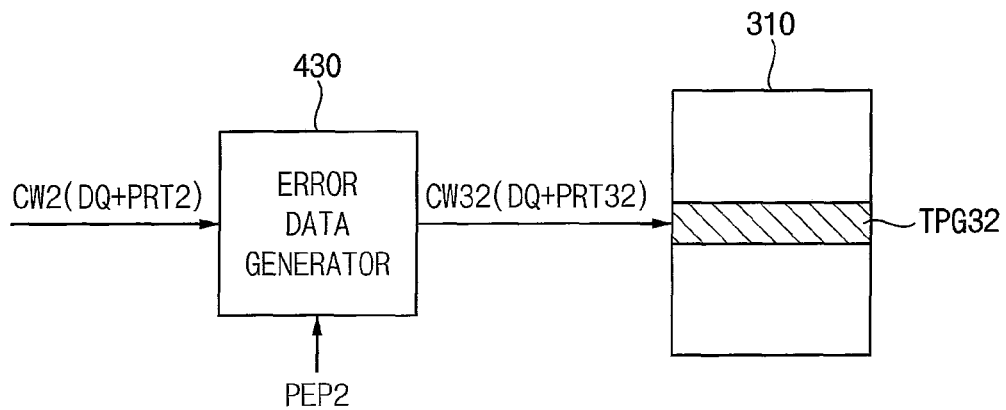

FIGS. 21 and 22 illustrate operations of the error data generator in the on-die ECC engine of FIG. 5, respectively, according to example embodiments.

Referring to FIGS. 5 and 21, when the main data DQ includes the first type of uncorrectable errors, the register 435 provides the first type of error pattern PEP1 to the error data generator 430. The error data generator 430 applies the first type of error pattern PEP1 to the second codeword CW2 including the main data DQ and the second parity data PRT2 to generate the third codeword CW31 including the main data DQ and the third parity data PRT31 and stores the third codeword CW31 in a target page TPG31 of the first bank array 310.

Referring to FIGS. 5 and 22, when the main data DQ includes the second type of uncorrectable errors, the register 435 provides the second type of error pattern PEP2 to the error data generator 430. The error data generator 430 applies the second type of error pattern PEP2 to the second codeword CW2 including the main data DQ and the second parity data PRT2 to generate the third codeword CW32 including the main data DQ and the third parity data PRT32 and stores the third codeword CW32 in a target page TPG32 of the first bank array 310.

Figure 23:
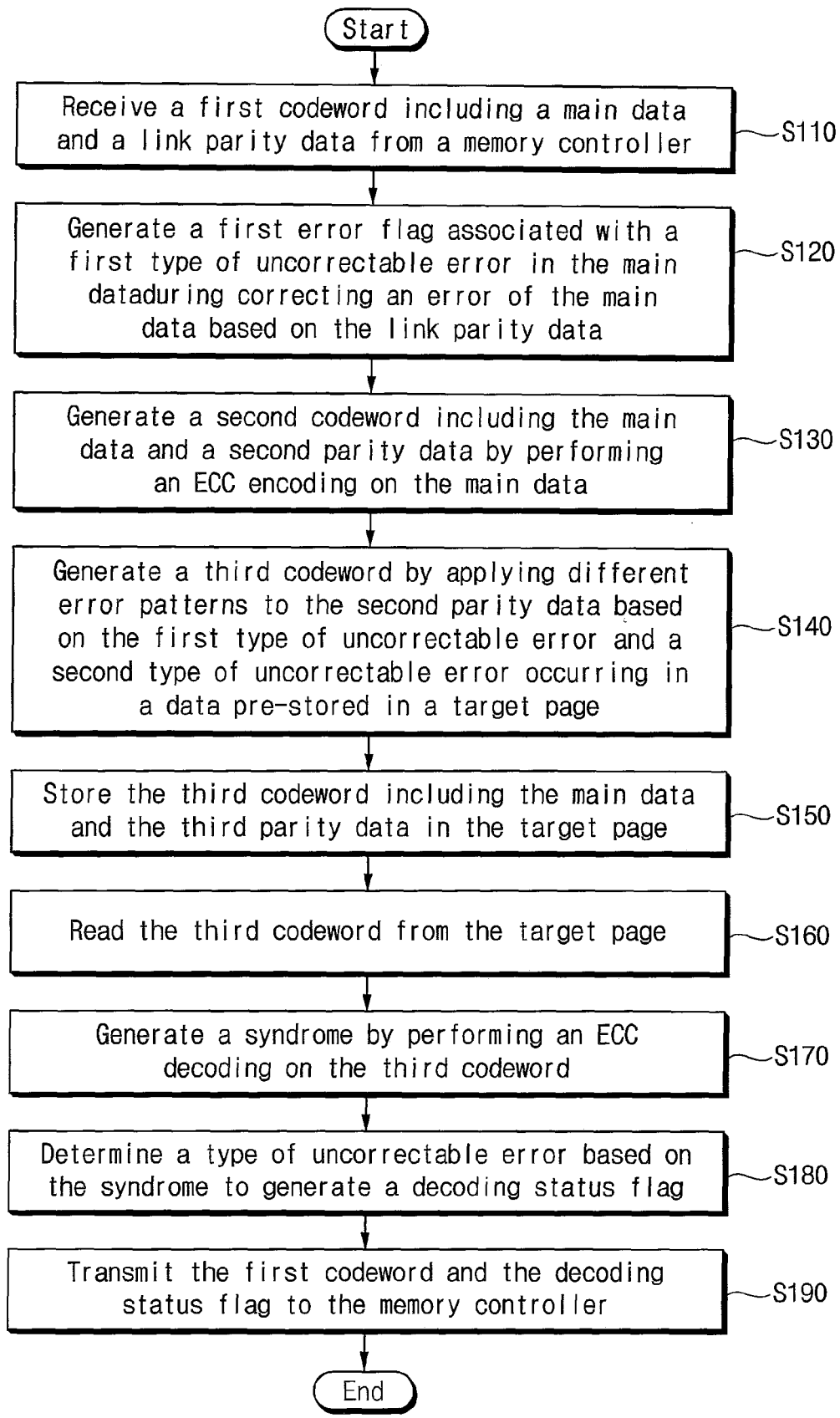
FIG. 23 is a flow chart illustrating a method of operating a semiconductor memory device.
Figure 24:
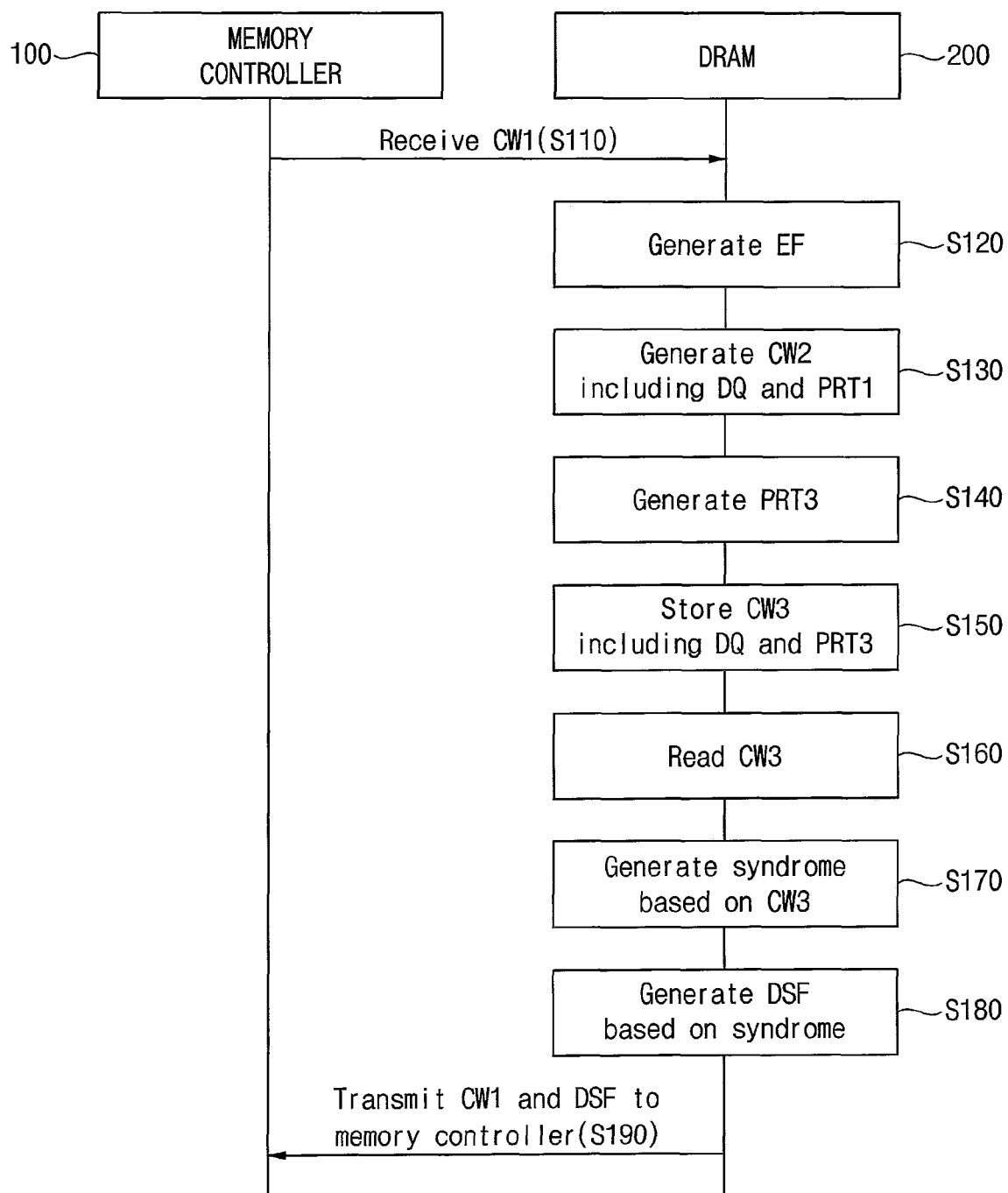
FIG. 24 is a sequence chart illustrating a method of operating a semiconductor memory device.

FIG. 23 is a flow chart illustrating a method of operating a semiconductor memory device and FIG. 24 is a sequence chart illustrating a method of operating a semiconductor memory device.

Referring to FIGS. 1 through 24, the memory controller 100 transmits the first codeword CW1 including the main data DQ and the link parity data LPRT.

The link ECC engine 295 in the semiconductor memory device 200 receives the first codeword CW1 (operation S110).

The link ECC engine 295 performs a first ECC decoding on the first codeword CW1 based on the first ECC ECC1 to correct an error in the main data DQ and generates the first error flag EF1 that is activated when the first type of uncorrectable errors is detected (operation S120).

The ECC encoder 420 in the on-die ECC engine 400 performs a first ECC encoding on the main data DQ based on the second ECC ECC2 to generate the second codeword CW2 including the main data DQ and the second parity data PRT2 (operation S130).

The error data generator 430 in the on-die ECC engine 400 generates the third parity data PRT3 by applying different error patterns to the second parity data PRT2 based on one of the first type of uncorrectable errors and the second type of uncorrectable errors associated with the data stored in the target page (operation S140).

The error data generator 430 stores the third codeword CW3 including the main data DQ and the third parity data PRT3 in the target page (operation S150).

The ECC decoder 440 in the on-die ECC engine 400 reads the third codeword CW3 from the target page of the memory cell array 300 (operation S160).

The ECC decoder 440 performs the second ECC decoding on the third codeword CW3 based on the second ECC ECC2 to generate the syndrome SDR (operation S170).

The ECC decoder 440 identifies the type of the uncorrectable errors based on the syndrome SDR and generates the decoding status flag DSF (operation S180). For example, when the syndrome SDR matches the first type of error pattern PEP1, the ECC decoder 440 determines that the first type of uncorrectable errors occurs. When the syndrome SDR matches the second type of error pattern PEP2, the ECC decoder 440 determines that the second type of uncorrectable errors occurs.

The link ECC engine 295 performs the first ECC encoding on the main data DQ based on the first ECC ECC1 to generate the link parity data LPRT. The semiconductor memory device 200 transmits, to the memory controller 100, the decoding status flag DSF and the first codeword CW1 including the main data DQ and the link parity data LPRT (operation S190).

Figure 25:
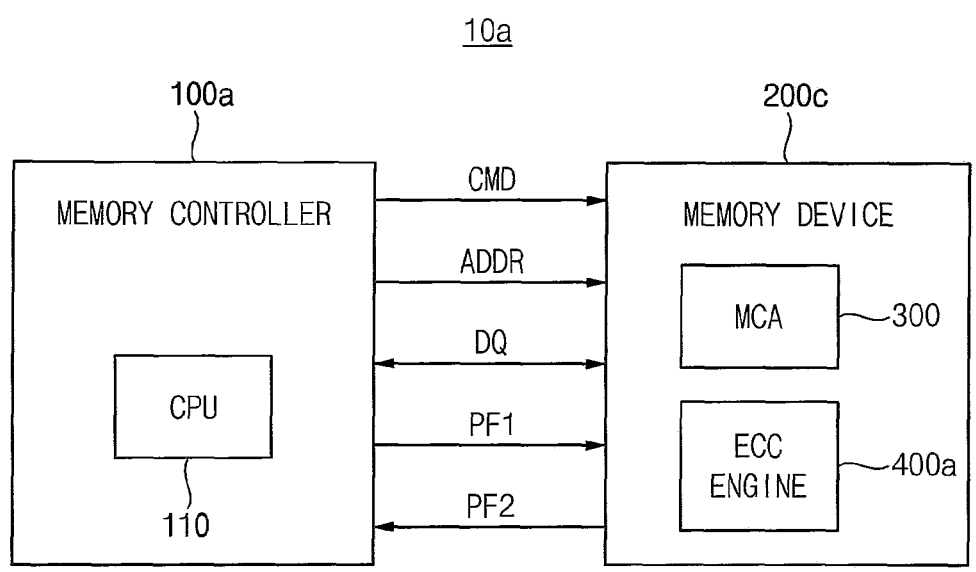
FIG. 25 is a block diagram illustrating a memory system according to example embodiments.

FIG. 25 is a block diagram illustrating a memory system according to example embodiments.

Referring to FIG. 25, a memory system 10a may include a memory controller 100a and a semiconductor memory device 200c.

The memory controller 100a may control overall operation of the memory system 10a and may control data exchange between an external host and the semiconductor memory device 200c.

The memory controller 100a may transmit a command CMD and an address ADDR to the semiconductor memory device 200c and may exchange a data DQ with the semiconductor memory device 200c. The data DQ may correspond to a normal data or a poisoned data. The memory controller 100a may transmit the poisoned data to the semiconductor memory device 200c in a write operation. The poisoned data may refer to data including error (or bit in which an error occurs).

The memory controller 100a may transmit a poison flag PF1 indicating whether the data DQ corresponds to the poisoned data to the semiconductor memory device 200c. The semiconductor memory device 200c may transmit the poisoned data to the memory controller 100a in a read operation. The poisoned data is transmitted from the memory controller 100a and is written in the memory cell array 300. For example, in a write operation, the semiconductor memory device 200c receives the poisoned data and writes the poisoned data in the memory cell array 300. The semiconductor memory device 200c, in a read operation, reads the poisoned data from the memory cell array 300 and transmits the poisoned data to the memory controller 100a. The semiconductor memory device 200c may transmits a poison flag PF2 to the memory controller 100a, which indicates whether the data DQ, transmitted to the memory controller 100a, corresponds to the poisoned data. The poisoned data may refer to data including error generated by the memory controller 100a.

The memory controller 100a may include a CPU 110 to control overall operation of the memory controller 100a.

The semiconductor memory device 200c may include an on-die ECC engine 400a and the memory cell array 300.

The on-die ECC engine 400a may receive the data DQ and the poison flag PF1, and may perform one of a normal write operation and a masked write operation on a target page of the memory cell array 300 based on the command CMD.

When the command CMD designates the normal write operation and the poison flag PF1 indicates the data DQ correspond to the poisoned data, the on-die ECC engine 400a may perform an ECC encoding on the poisoned data DQ to generate a first codeword including the poisoned data DQ and a first parity data, may generate a second codeword including uncorrectable errors by applying the first type of error pattern to the first codeword, and may write the second codeword to a target page of the memory cell array 300. The first type of error pattern may be an error pattern indicating that the uncorrectable errors in the second codeword are due to the poisoned data DQ. The on-die ECC engine 400a applies the first type of error pattern to the first codeword by inverting (flipping) at least one bit of the first parity data, or by inverting at least one of bits of the first codeword to generate the second codeword.

When the command CMD designates the masked write operation, the on-die ECC engine 400a may perform an ECC decoding on a codeword that is pre-stored in the target page.

When the on-die ECC engine 400a detects uncorrectable errors in the pre-stored codeword based on a result of the ECC decoding, the on-die ECC engine 400a generates an error flag indicating that the uncorrectable errors are detected in the pre-stored codeword, performs an ECC encoding on the data DQ to generate a first parity data, generates a second codeword including the data DQ and a second parity data by applying a second error pattern different from the first error pattern to a first codeword including the data DQ and the first parity data, based on the error flag, and provides the second codeword to the target page.

When the command CMD designates the masked write operation and the poison flag PF1 indicates the data DQ correspond to the poisoned data, the on-die ECC engine 400a may perform an ECC encoding on the poisoned data DQ to generate a first codeword including the poisoned data DQ and a first parity data, may generate a second codeword including uncorrectable errors by applying the first type of error pattern to the first codeword, and may write the second codeword to a target page of the memory cell array 300.

When the command CMD designates a read operation, the on-die ECC engine 400a reads the second codeword from the target page, performs an ECC decoding on the second codeword to generate a syndrome, detects the uncorrectable errors in the second codeword and determines whether the uncorrectable errors are associated with the poisoned data or memory cells in the target page based on the syndrome. When the uncorrectable errors are associated with the poisoned data, the semiconductor memory device 200c may transmit, to the memory controller 100a, the poison flag PF2 indicating that the data DQ, to be transmitted to the memory controller 100a, corresponds to the poisoned flag.

The semiconductor memory device 200c may have a similar configuration with the semiconductor memory device 200a of FIG. 3 or the semiconductor memory device 200b of FIG. 10.

The semiconductor memory device 200c may not include the link ECC engine 295 in the semiconductor memory device 200a of FIG. 3 or the semiconductor memory device 200b of FIG. 10.

Figure 26A:
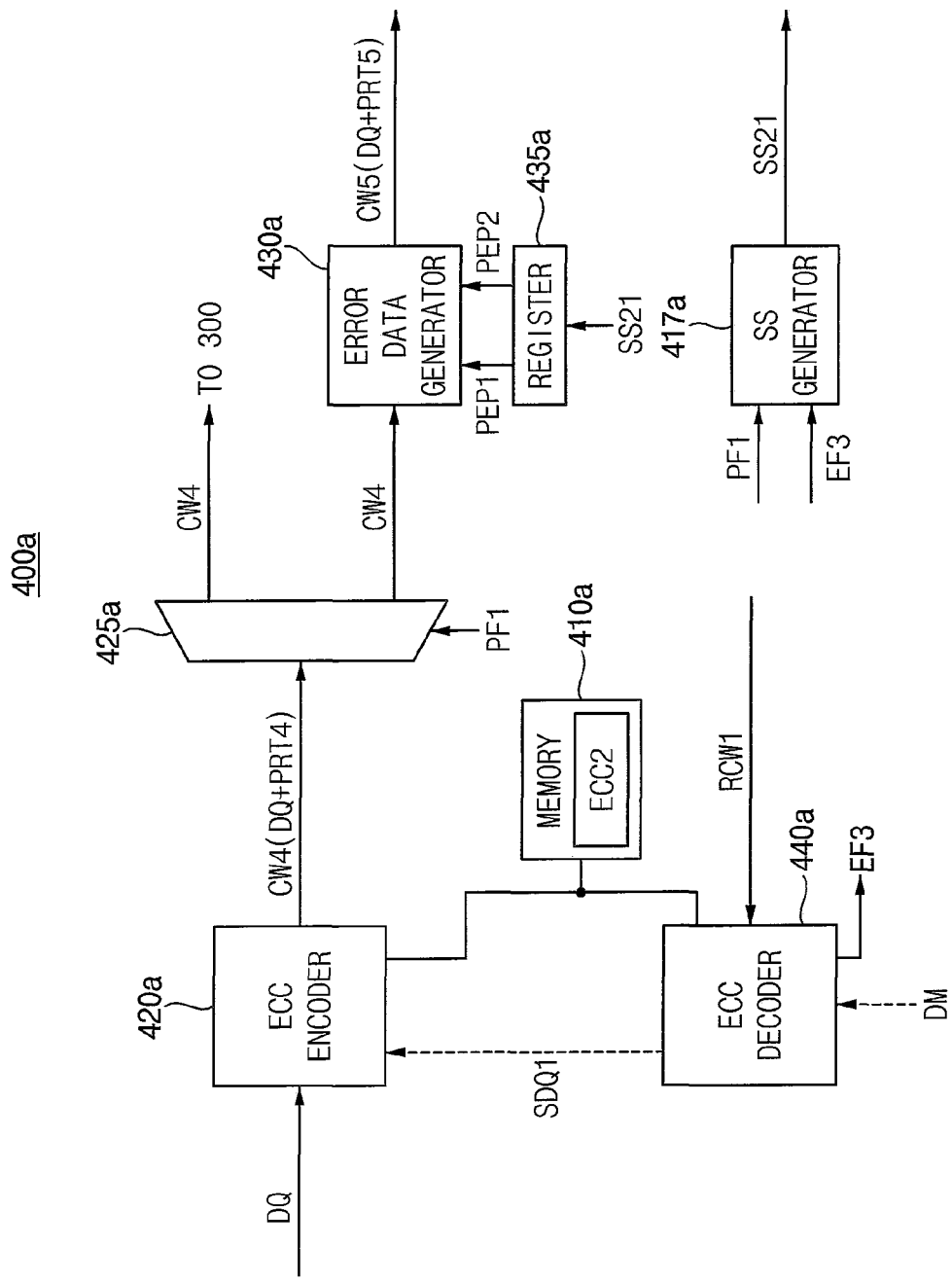
FIG. 26A is a block diagram illustrating on-die ECC engine in the semiconductor memory device of FIG. 25 according to example embodiments.

FIG. 26A is a block diagram illustrating an on-die ECC engine in the semiconductor memory device of FIG. 25 according to example embodiments.

FIG. 26A illustrates an operation of the on-die ECC engine 400a in a write operation.

Referring to FIG. 26A, the on-die ECC engine 400a may include an ECC memory 410a, an ECC encoder 420a, an ECC decoder 440a, a demultiplexer 425a, an error data generator 430a, a register 435a and a selection signal generator 417a.

The ECC memory 410a may store a second ECC ECC2. The ECC encoder 420a and the ECC decoder 440a may be connected to the ECC memory 410a. The second ECC ECC2 may be a SEC code for correcting one error bit or SECDED code.

The ECC encoder 420a, in a normal write operation, may perform an ECC encoding on the main data DQ to generate a second parity data PRT4 by using the second ECC ECC2 and may provide a second codeword CW4 including the main data DQ and the second parity data PRT4 to the demultiplexer 425a.

The demultiplexer 425a may provide the second codeword CW4 to one of the target page and the error data generator 430a based on the poison flag PF1. The demultiplexer 425a provides the second codeword CW4 to the target page in response to the poison flag PF1 indicating that the data DQ does not correspond to the poisoned data. The demultiplexer 425a provides the second codeword CW4 to the error data generator 430a in response to the poison flag PF1 indicating that the data DQ corresponds to the poisoned data.

When the data DQ correspond to the poisoned data, the error data generator 430a may apply the first type of error pattern PEP1 from the register 435a to the first parity data PRT4 to generate a second parity data PRT5, may generate a second codeword CW5 by replacing the first parity data PRT4 with the second parity data PRT5 and may provide the second codeword CW5 including the data DQ and the second parity data PRT5 to the target page.

The ECC decoder 440a, in the masked write operation, may receive a pre-stored codeword RCW1 from the target page, and may perform an ECC decoding on the pre-stored codeword RCW1 by using the second ECC ECC2. When the pre-stored codeword RCW1 includes correctable errors, the ECC decoder 440a may correct the correctable errors in the pre-stored codeword RCW, and may provide a selectively corrected data SDQ1 to the ECC encoder 420a. When the pre-stored codeword RCW1 include uncorrectable errors, the ECC decoder 440a may generate an error flag EF3, and may provide the error flag EF3 to the selection signal generator 417a.

The ECC encoder 420a, in the masked write operation, may generate the first parity data PRT4 based on the main data DQ and the selectively corrected data SDQ1 and may provide the first codeword CW4 including the data DQ and the first parity data PRT4 to the demultiplexer 425a.

The selection signal generator 471a may generate at selection signal SS21 based on the poison flag PF1 and the error flag EF3, and may provide the selection signal SS21 to the register 435a.

The register 435a may store a first type of error pattern PEP1 and a second type of error pattern PEP2 and may provide one of the first type of error pattern PEP1 and the second type of error pattern PEP2 to the error data generator 430a based on the selection signal SS21.

The register 435a may provide the first type of error pattern PEP1 to the error data generator 430a in response to the selection signal SS21 when the poison flag PF1 indicates that the data DQ corresponds to the poisoned data or the error flag EF3 indicates that the pre-stored codeword RCW1 include the poisoned data. The register 435a may provide the second type of error pattern PEP2 to the error data generator 430a in response to the selection signal SS21 when the error flag EF3 indicates that that the pre-stored codeword RCW1 does not correspond to the poisoned data and includes uncorrectable errors.

The error data generator 430a may apply one of the first type of error pattern PEP1 and the second type of error pattern PEP2 to the first parity data PRT4 to generate the second parity data PRT5, may replace the second parity data PRT5 with the third parity data PRT4 to provide the second codeword CW5 including the data DQ and the second parity data PRT5 to the target page. In the masked write operation, the error data generator 430a may apply first type of error pattern PEP1 to the first codeword CW4 to generate the second codeword CW5 when the error flag EF3 indicates that the pre-stored codeword RCW1 includes the poisoned data. In the masked write operation, the error data generator 430a may apply the second type of error pattern PEP2 to the first codeword CW4 to generate the second codeword CW5 when the error flag EF3 indicates that the pre-stored codeword RCW1 does not correspond to the poisoned data and includes uncorrectable errors.

Figure 26B:
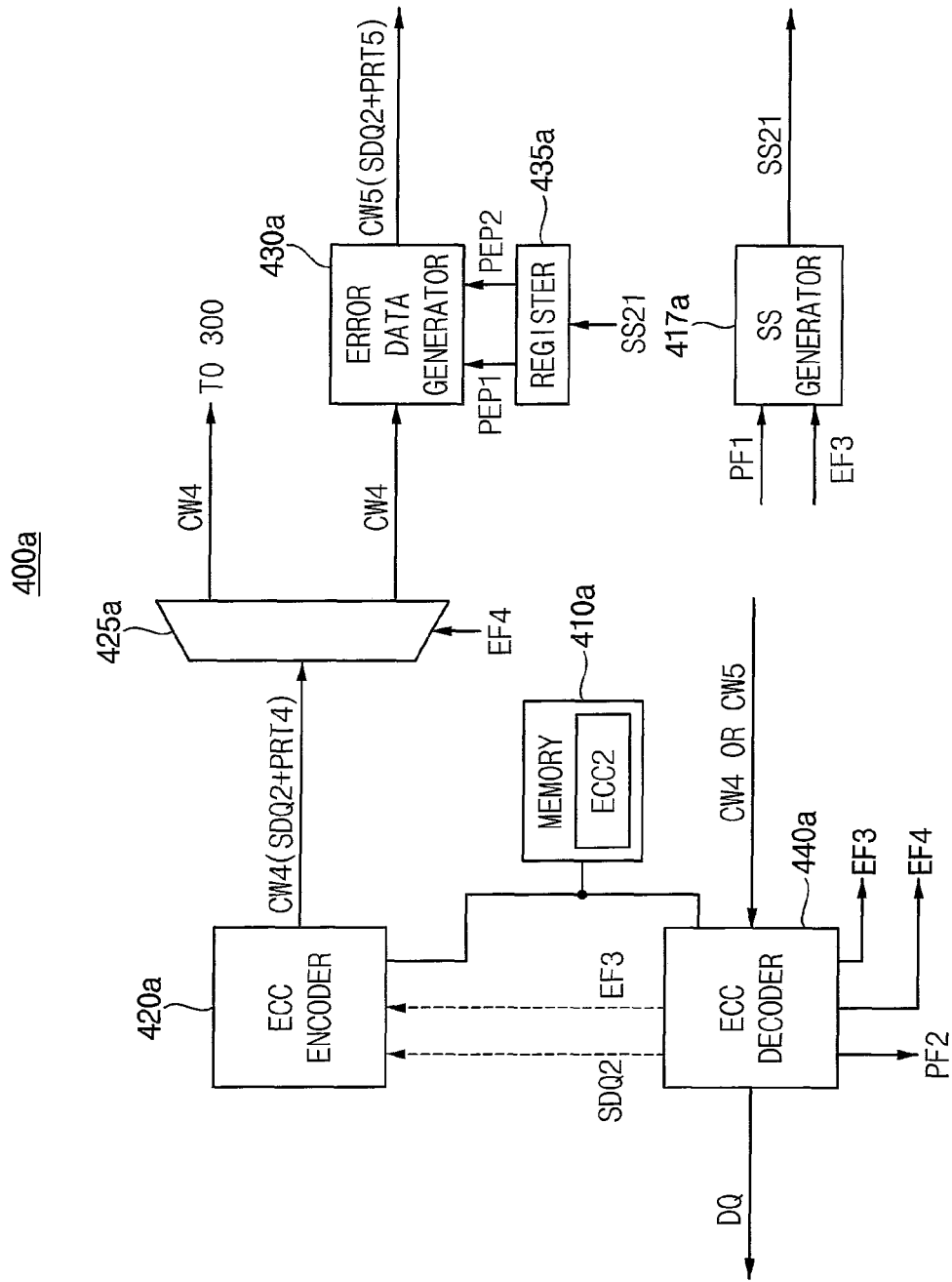
FIG. 26B illustrates an operation of the on-die ECC engine of FIG. 26A in a read operation or a scrubbing operation.

FIG. 26B illustrates an operation of the on-die ECC engine of FIG. 26A in a read operation or a scrubbing operation.

The ECC decoder 440a, in a read operation, may perform an ECC decoding on a read codeword (the first codeword CW4 or the second codeword CW5) by using the second ECC ECC2, may recover the data DQ to transmit the data DQ to the memory controller 100a and may generate the poison flag PF2 indicating whether the data DQ correspond to the poisoned data.

The ECC decoder 440a, in a scrubbing (error check and scrub) operation, may perform an ECC decoding on the read codeword (the first codeword CW4 or the second codeword CW5) by using the second ECC ECC2, may correct correctable error in the read codeword, may provide a selectively corrected data SDQ2 to the ECC encoder 420a, may generate the error flag EF3 indicating a result of the ECC decoding, may generate an error flag EF4 when the read codeword includes the poisoned data or the uncorrectable errors and may provide the error flag EF4 to the demultiplexer 425a.

The ECC encoder 420a, in the scrubbing operation, may generate the first parity data PRT4 based on the main data DQ and the selectively corrected data SDQ2 and may provide the first codeword CW4 including the data DQ and the first parity data PRT4 to the demultiplexer 425a.

The demultiplexer 425a provides the second codeword CW4 to the target page in response to the error flag EF4 indicating that the selectively corrected data SDQ2 does not include the poisoned data or the uncorrectable errors. The demultiplexer 425a provides the second codeword CW4 to the error data generator 430a in response to the error flag EF4 indicating that the selectively corrected data SDQ2 include the poisoned data or the uncorrectable errors.

The error data generator 430a may apply the first type of error pattern PEP1 to the first codeword CW4 to generate the second codeword CW5 when the selectively corrected data SDQ2 are poisoned data. The error data generator 430a may apply the second type of error pattern PEP2 to the first codeword CW4 to generate the second codeword CW5 when the selectively corrected data SDQ2 does not include the poisoned data and includes the uncorrectable errors.

In example embodiments, when the selectively corrected data SDQ2 include the poisoned data, the on-die ECC engine 400a may not include error bits in error count associated with the target page in the scrubbing operation. In addition, when the selectively corrected data SDQ2 include the poisoned data, the on-die ECC engine 400a may skip writing the corrected data in the target page in the scrubbing operation.

Figure 27:
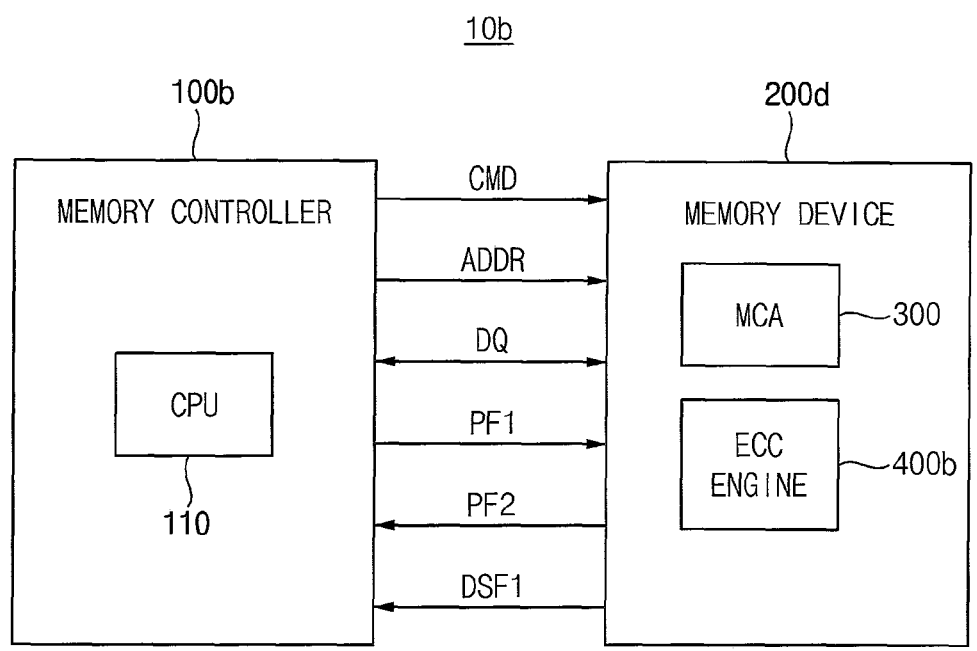
FIG. 27 is a block diagram illustrating a memory system according to example embodiments.

FIG. 27 is a block diagram illustrating a memory system according to example embodiments.

Referring to FIG. 27, a memory system 10b may include a memory controller 100b and a semiconductor memory device 200d.

The memory controller 100b may control overall operation of the memory system 10b and may control data exchange between an external host and the semiconductor memory device 200d.

The memory controller 100b may transmit a command CMD and an address ADDR to the semiconductor memory device 200d and may exchange data DQ with the semiconductor memory device 200d. The data DQ may correspond to normal data or poisoned data. The memory controller 100b may transmit the poisoned data to the semiconductor memory device 200d. The poisoned data may correspond to data including error (or bit in which an error occurs).

The memory controller 100b may transmit a poison flag PF1 indicating whether the data DQ corresponds to the poisoned data to the semiconductor memory device 200d. The semiconductor memory device 200d may transmit the poisoned data to the memory controller 100b. The poisoned data are transmitted from the memory controller 100b and are written in the memory cell array 300.

For example, in a write operation, the semiconductor memory device 200d receives the poisoned data and writes the poisoned data in the memory cell array 300. The semiconductor memory device 200d, in a read operation, reads the poisoned data from the memory cell array 300 and transmits the poisoned data to the memory controller 100b.

The semiconductor memory device 200d may transmit a decoding status flag DSF1 and a poison flag PF2 to the memory controller 100b. The poison flag PF2 indicates whether the data DQ transmitted to the memory controller are poisoned data. The decoding status flag DSF indicates whether the data DQ include uncorrectable errors. The semiconductor memory device 200d may transmit the decoding status flag DSF1 and the poison flag PF2 to the memory controller 100b through error detection code (EDC) pins.

For example, when the decoding status flag DSF has a first logic level (a logic high level), the decoding status flag DSF1 indicates that the data DQ include uncorrectable errors and when the poison flag PF2 has a first logic level, the poison flag PF2 indicates that the data DQ corresponds to the poisoned data. When the decoding status flag DSF1 has a first logic level and the poison flag PF2 has a second logic level (a logic low level), the memory cells in the target page may have uncorrectable errors.

The memory controller 100b may include a CPU 110 to control overall operation of the memory controller 100b.

The semiconductor memory device 200d may include an on-die ECC engine 400b and the memory cell array 300.

In one of a normal write operation and a masked write operation performed on a target page of the memory cell array 300 in response to the command CMD, the on-die ECC engine 400b may receive the data DQ and may perform an ECC operation on the received data DQ.

When the command CMD designates the normal write operation and the poison flag PF1 indicates the data DQ corresponds to the poisoned data, the on-die ECC engine 400b may perform an ECC encoding on the poisoned data DQ to generate a first codeword including the poisoned data DQ and a first parity data, may generate a second codeword including uncorrectable errors by applying the first type of error pattern to the first codeword, and may write the second codeword to a target page of the memory cell array 300. The first type of error pattern may be an error pattern indicating that the data DQ of the second codeword are poisoned data. The on-die ECC engine 400b applies the first type of error pattern to the first codeword by inverting (flipping) at least one bit of the first parity data, or by inverting at least one of bits of the first codeword to generate the second codeword.

When the command CMD designates the masked write operation, the on-die ECC engine 400b may perform an ECC decoding on a codeword that is pre-stored in the target page.

When the on-die ECC engine 400b detects uncorrectable errors in the pre-stored codeword based on a result of the ECC decoding, the on-die ECC engine 400b generates an error flag indicating that the uncorrectable errors are detected in the pre-stored codeword, performs an ECC encoding on the data DQ to generate a first parity data, generates a second codeword including the data DQ and a second parity data by applying a second error pattern different from the first error pattern to a first codeword including the data DQ and the first parity data, based on the error flag, and provides the second codeword to the target page.

When the command CMD designates the masked write operation and the poison flag PF1 indicates the data DQ are poisoned data, the on-die ECC engine 400b may perform an ECC encoding on the poisoned data DQ to generate a first codeword including the poisoned data DQ and a first parity data, may generate a second codeword including uncorrectable errors by applying the first type of error pattern to the first codeword, and may write the second codeword to a target page of the memory cell array 300.

When the command CMD designates a read operation, the on-die ECC engine 400b reads the second codeword from the target page, performs an ECC decoding on the second codeword to recover the data DQ, activates the decoding status flag DSF1 when the uncorrectable errors are detected in the second codeword, activates the poison flag PF2 when the error detected in the second codeword is associated with the poisoned data, transmits, to the memory controller 100a, the data DQ, the poison flag PF2 and the decoding status flag DSF1.

The semiconductor memory device 200d in FIG. 27 may have a similar configuration to the semiconductor memory device 200a of FIG. 3 or the semiconductor memory device 200b of FIG. 10.

The semiconductor memory device 200d in FIG. 27 may not include the link ECC engine 295 in the semiconductor memory device 200a of FIG. 3 or the semiconductor memory device 200b of FIG. 10.

Figure 28A:
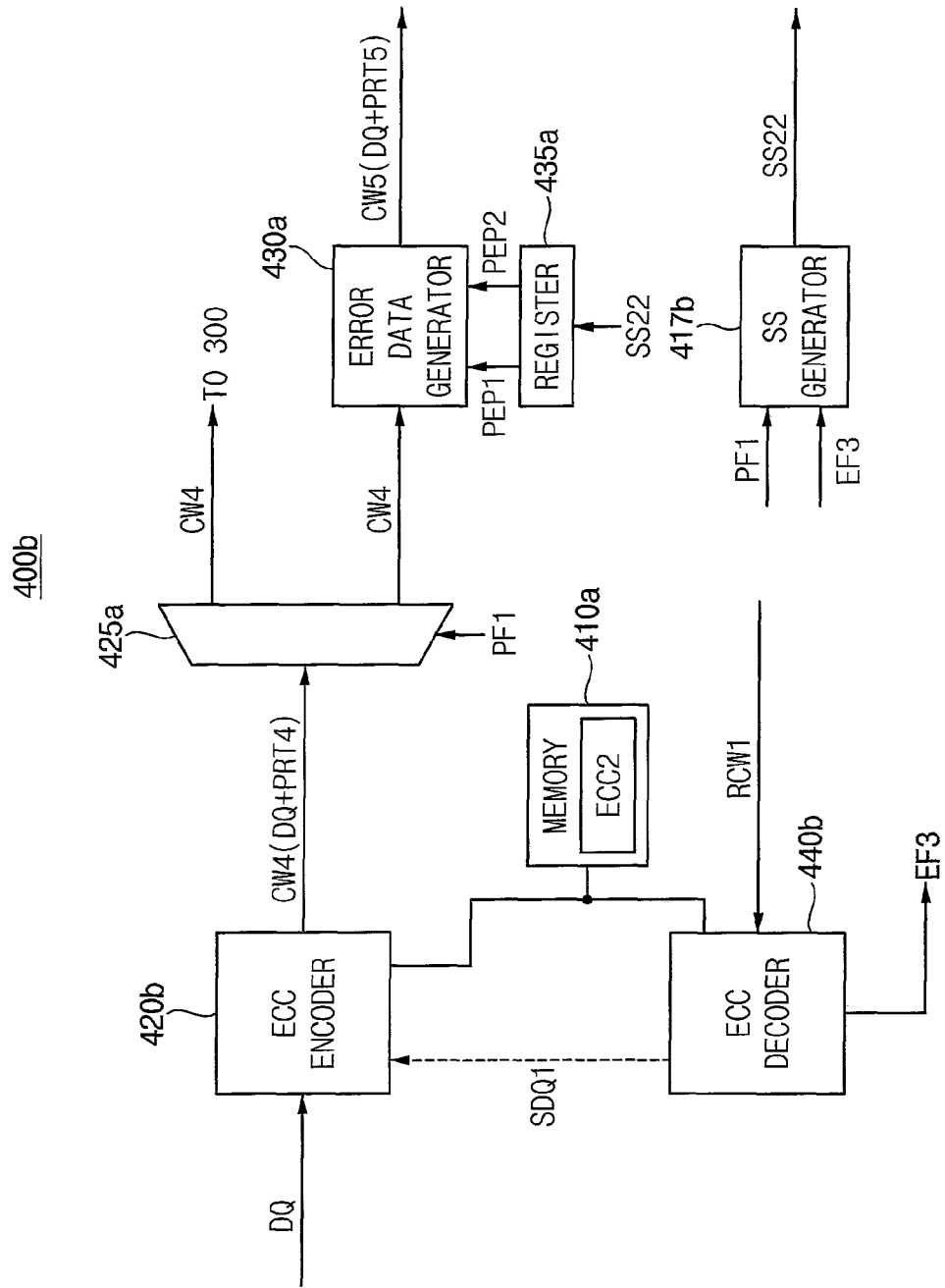
FIG. 28A is a block diagram illustrating on-die ECC engine in the semiconductor memory device of FIG. 27 according to example embodiments.

FIG. 28A is a block diagram illustrating on-die ECC engine in the semiconductor memory device of FIG. 27 according to example embodiments.

FIG. 28A illustrates an operation of the on-die ECC engine 400b in a write operation.

Referring to FIG. 28A, the on-die ECC engine 400b may include an ECC memory 410a, an ECC encoder 420b, an ECC decoder 440b, a demultiplexer 425a, an error data generator 430a, a register 435a and a selection signal generator 417b.

The ECC memory 410a may store a second ECC ECC2 and the ECC encoder 420b and the ECC decoder 440b may be connected to the ECC memory 410a. The second ECC ECC2 may be a SEC code for correcting one error bit or SECDED code.

The ECC encoder 420b, in a normal write operation, may perform an ECC encoding on the main data DQ to generate a second parity data PRT4 by using the second ECC ECC2 and may provide a second codeword CW4 including the main data DQ and the second parity data PRT4 to the demultiplexer 425a.

The demultiplexer 425a may provide the second codeword CW4 to one of the target page and the error data generator 430a based on the poison flag PF1. The demultiplexer 425a provides the second codeword CW4 to the target page in response to the poison flag PF1 indicating that the data DQ do not correspond to the poisoned data. The demultiplexer 425a provides the second codeword CW4 to the error data generator 430a in response to the poison flag PF1 indicating that the data DQ are poisoned data.

When the data DQ are poisoned data, the error data generator 430a may apply the first type of error pattern PEP1 from the register 435a to the first parity data PRT4 to generate a second parity data PRT5, may generate a second codeword CW5 by replacing the first parity data PRT4 with the second parity data PRT5 and may provide the second codeword CW5 including the data DQ and the second parity data PRT5 to the target page.

The ECC decoder 440b, in the masked write operation, may receive a pre-stored codeword RCW1 from the target page, may perform an ECC decoding on the pre-stored codeword RCW1 by using the second ECC ECC2, may correct correctable error in the pre-stored codeword RCW, may provide a selectively corrected data SDQ1 to the ECC encoder 420b, may generate an error flag EF3 when the pre-stored codeword RCW1 are poisoned data or may include the uncorrectable errors, and may provide the error flag EF3 to the selection signal generator 417b.

The ECC encoder 420b, in the masked write operation, may generate the first parity data PRT4 based on the main data DQ and the selectively corrected data SDQ1 and may provide the first codeword CW4 including the data DQ and the first parity data PRT4 to the demultiplexer 425a.

The selection signal generator 471b may generate at selection signal SS22 based on the poison flag PF1 and the error flag EF3, and may provide the selection signal SS22 to the register 435a.

The register 435a may store a first type of error pattern PEP1 and a second type of error pattern PEP2 and may provide one of the first type of error pattern PEP1 and the second type of error pattern PEP2 to the error data generator 430a based on the selection signal SS22.

The register 435a may provide the first type of error pattern PEP1 to the error data generator 430a in response to the selection signal SS22 when the poison flag PF1 indicates that the data DQ corresponds to the poisoned data generated by the memory controller 100 or generated during the being transmitted or the error flag EF3 indicates that the pre-stored codeword RCW1 includes the poisoned data. The register 435a may provide the second type of error pattern PEP2 to the error data generator 430a in response to the selection signal SS22 when the error flag EF3 indicates that that the pre-stored codeword RCW1 does not correspond to the poisoned data but includes uncorrectable errors.

The error data generator 430a may apply one of the first type of error pattern PEP1 and the second type of error pattern PEP2 to the first parity data PRT4 to generate the second parity data PRT5, may replace the second parity data PRT5 with the third parity data PRT4 to provide the second codeword CW5 including the data DQ and the second parity data PRT5 to the target page. In the masked write operation, the error data generator 430a may apply the first type of error pattern PEP1 to the first codeword CW4 to generate the second codeword CW5 when the error flag EF3 indicates that the pre-stored codeword RCW1 includes the poisoned data. In the masked write operation, the error data generator 430a may apply the second type of error pattern PEP2 to the first codeword CW4 to generate the second codeword CW5 when the error flag EF3 indicates that the pre-stored codeword RCW1 does not correspond to the poisoned data but includes uncorrectable errors.

Figure 28B:
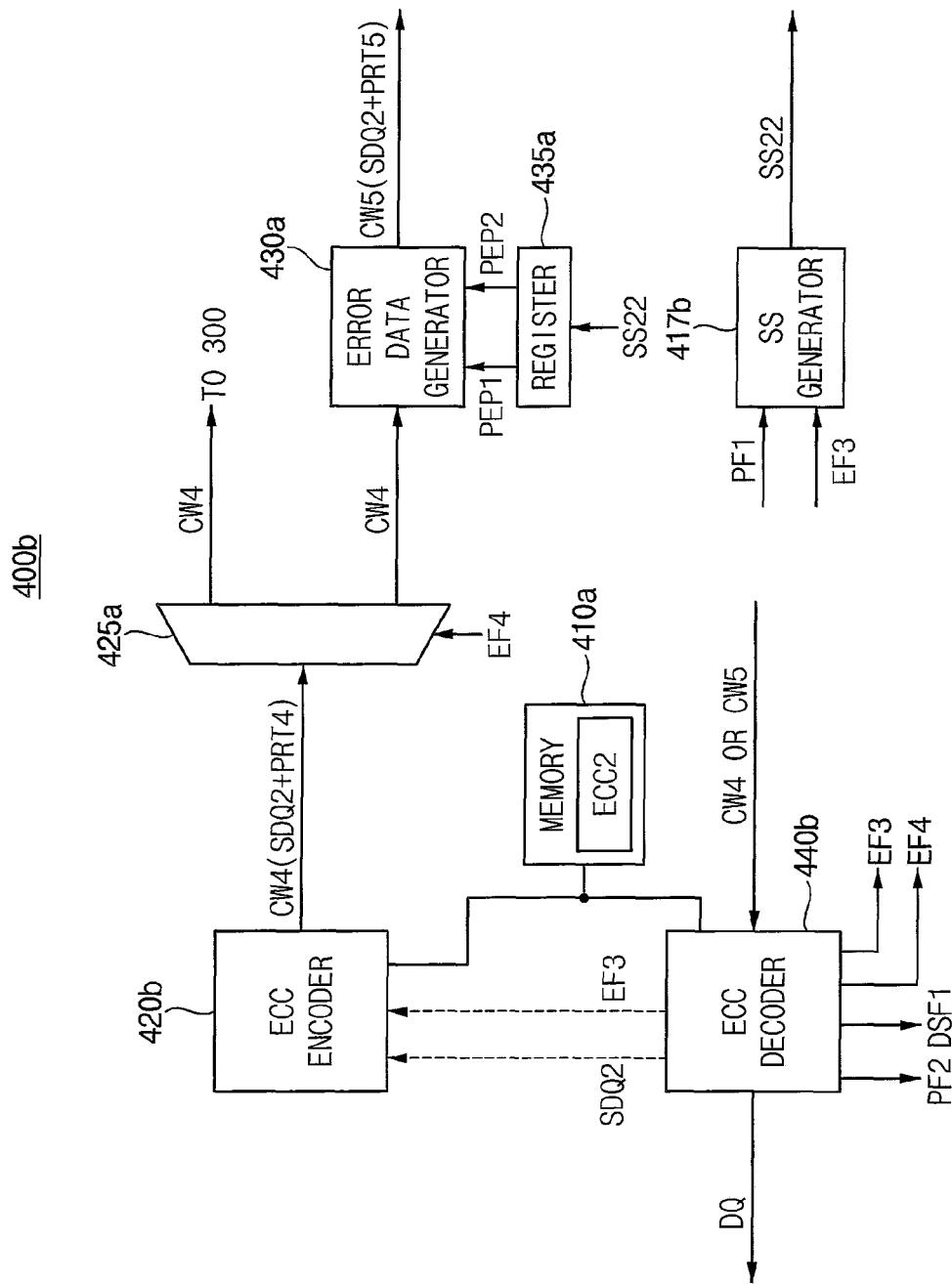
FIG. 28B illustrates an operation of the on-die ECC engine of FIG. 28A in a read operation or a scrubbing operation.

FIG. 28B illustrates an operation of the on-die ECC engine of FIG. 28A in a read operation or a scrubbing operation.

The ECC decoder 440b, in a read operation, may perform an ECC decoding on a read codeword (the first codeword CW4 or the second codeword CW5) by using the second ECC ECC2, may recover the data DQ to transmit the data DQ to the memory controller 100a, may generate the poison flag PF2 indicating whether the data DQ correspond to the poisoned data and may generate the decoding status flag DSF1 indicating whether the data DQ include the uncorrectable errors.

The ECC decoder 440b, in a scrubbing (error check and scrub) operation, may perform an ECC decoding on the read codeword (the first codeword CW4 or the second codeword CW5) by using the second ECC ECC2, may correct correctable error in the read codeword, may provide a selectively corrected data SDQ2 to the ECC encoder 420b, may generate the error flag EF3 indicating a result of the ECC decoding, may generate an error flag EF4 when the read codeword includes the poisoned data or the uncorrectable errors and may provide the error flag EF4 to the demultiplexer 425a.

The ECC encoder 420b, in the scrubbing operation, may generate the first parity data PRT4 based on the main data DQ and the selectively corrected data SDQ2 and may provide the first codeword CW4 including the data DQ and the first parity data PRT4 to the demultiplexer 425a.

The demultiplexer 425a provides the second codeword CW4 to the target page in response to the error flag EF4 indicating that the selectively corrected data SDQ2 does not include the poisoned data or the uncorrectable errors. The demultiplexer 425a provides the second codeword CW4 to the error data generator 430a in response to the error flag EF4 indicating that the selectively corrected data SDQ2 include the poisoned data or the uncorrectable errors.

The error data generator 430a may apply the first type of error pattern PEP1 to the first codeword CW4 to generate the second codeword CW5 when the selectively corrected data SDQ2 include the poisoned data. The error data generator 430a may apply the second type of error pattern PEP2 to the first codeword CW4 to generate the second codeword CW5 when the selectively corrected data SDQ2 do not include the poisoned data and include the uncorrectable errors.

In example embodiments, when the selectively corrected data SDQ2 include the poisoned data, the on-die ECC engine 400b may not count error bits arising from the poisoned data in counting error bits of the target page in the scrubbing operation. In addition, when the selectively corrected data SDQ2 include the poisoned data, the on-die ECC engine 400b may skip writing the corrected data in the target page ion the scrubbing operation.

Figure 29:
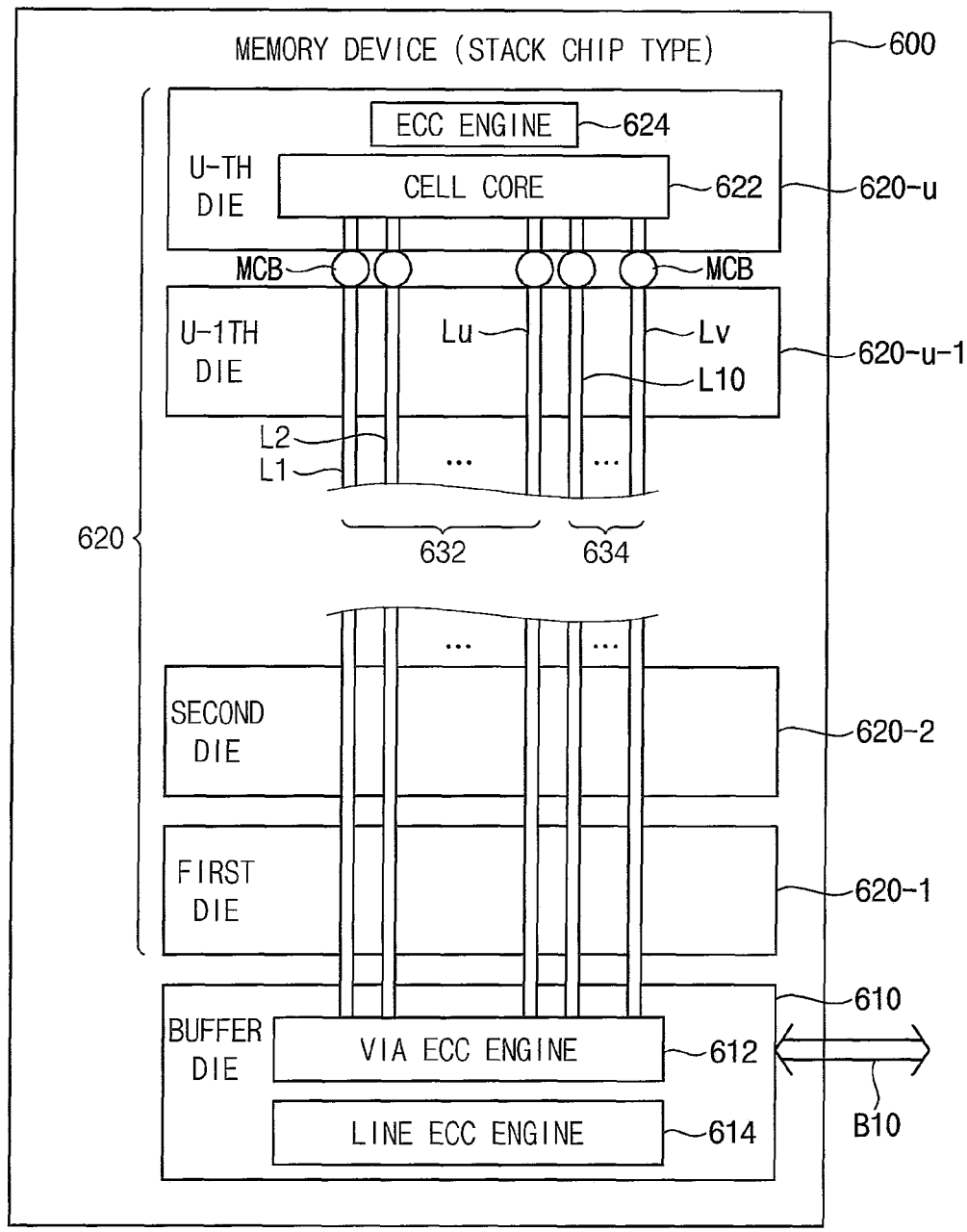
FIG. 29 is a block diagram illustrating a semiconductor memory device according to example embodiments.

FIG. 29 is a block diagram illustrating a semiconductor memory device according to example embodiments.

Referring to FIG. 29, a semiconductor memory device 600 may include a buffer die 610 and a plurality of dies 620 providing a soft error analyzing and correcting function in a stacked chip structure. In some embodiments, the buffer die 610 may be provided in plural.

The plurality of dies 620 may include memory dies 620-1 to 620-u (u is a natural number greater than two) which are stacked on the buffer die 610 and convey data through a plurality of through a plurality of silicon via (TSV) lines.

Each of the memory dies 620-1 to 620u may include a cell core 622 and an on-die ECC engine 624, and the cell core 622 may include a plurality of volatile memory cells coupled to a plurality of word-lines and a plurality of bit-lines.

The on-die ECC engine 624 may employ the on-die ECC engine 400 of FIG. 5.

Therefore, the on-die ECC engine 624, in a memory operation, may receive at least one of the main data and a codeword that is pre-stored in a target page, may generate third parity data by applying different error patterns to the first type of uncorrectable errors associated with main data provided from an outside and the first type of uncorrectable errors associated with the pre-stored codeword.

In addition, the on-die ECC engine 624 may identify a type of the uncorrectable errors based on syndrome matching the different error patterns.

The buffer die 610 may include a link ECC engine 614 and a via ECC engine 612 which corrects a transmission error using the transmission parity bits when a transmission error is detected from the transmission data received through the TSV lines and generate error-corrected data.

The link ECC engine 614 may employ the link ECC engine 295 in FIG. 5 and may perform a first ECC decoding on a first codeword including the main data and a link parity data received from the outside and may generate a first error flag that is activated when the main data include the first type of uncorrectable errors.

The semiconductor memory device 600 may be a stack chip type memory device or a stacked memory device which conveys data and control signals through the TSV lines. The TSV lines may also be called through electrodes.

A transmission error which occurs at the transmission data may be due to noise which occurs at the TSV lines. Since data fail due to the noise occurring at the TSV lines may be distinguishable from data fail due to a false operation of the memory die, it may be regarded as soft data fail (or a soft error). The soft data fail may be generated due to transmission fail on a transmission path, and may be detected and remedied by an ECC operation.

With the above description, a data TSV line group 632 which is formed at one memory die 620-u may include TSV lines L1 to Lu, and a parity TSV line group 634 may include TSV lines L10 to Lv.

The TSV lines L1 to Lu of the data TSV line group 632 and the parity TSV lines L10 to Lv of the parity TSV line group 634 may be connected to micro bumps MCB which are correspondingly formed among the memory dies 620-1 to 620-u.

Each of the memory dies 620-1 to 620-u may include DRAM cells each including at least one access transistor and one storage capacitor.

The semiconductor memory device 600 may have a three-dimensional (3D) chip structure or a 2.5D chip structure to communicate with a memory controller through a data bus B10. The at least one buffer die 610 may be connected with the memory controller through the data bus B10.

The via ECC engine 612 may determine whether a transmission error occurs at the transmission data received through the data TSV line group 632, based on the transmission parity bits received through the parity TSV line group 634.

When a transmission error is detected, the via ECC engine 612 may correct the transmission error on the transmission data using the transmission parity bits. When the transmission error is uncorrectable, the via ECC engine 612 may output information indicating occurrence of an uncorrectable data error.

Figure 30:
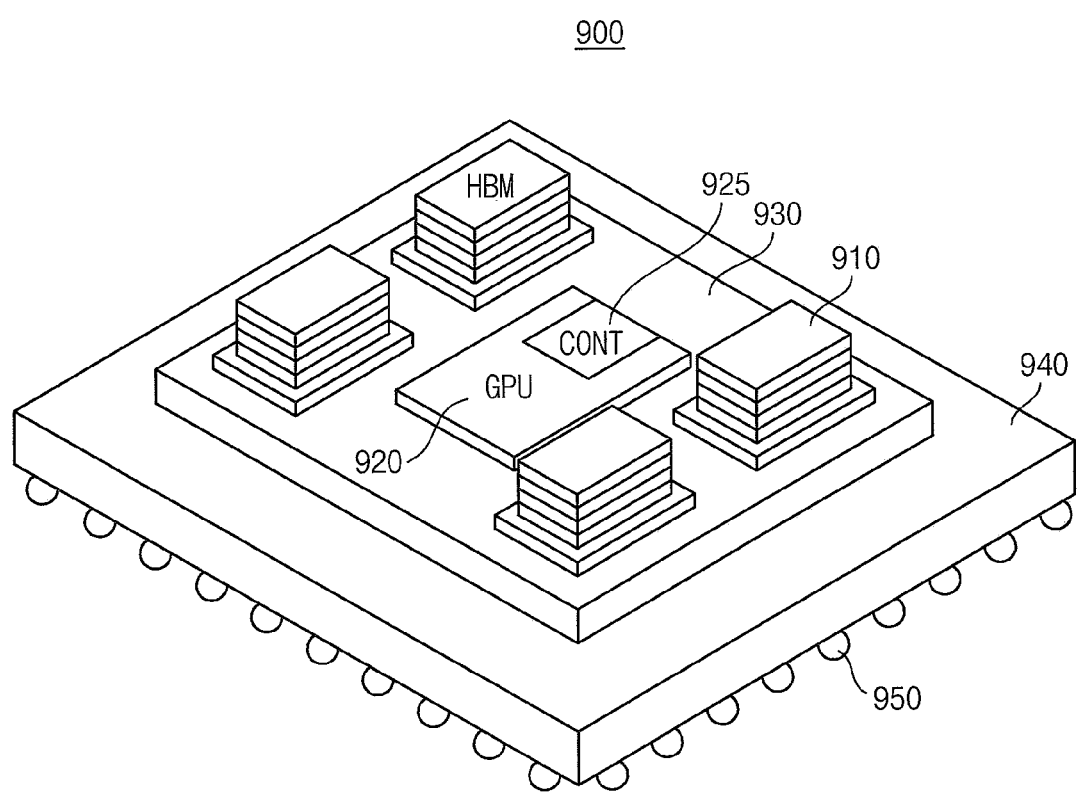
FIG. 30 is a diagram illustrating a semiconductor package including the stacked memory device according to example embodiments.

FIG. 30 is a diagram illustrating a semiconductor package including the stacked memory device according to example embodiments.

Referring to FIG. 30, a semiconductor package 900 may include one or more stacked memory devices 910 and a GPU 920 (graphic processing unit), and the GPU 920 includes a memory controller 925.

The stacked memory devices 910 and the GPU 920 may be mounted on an interposer 930, and the interposer 930 on which the stacked memory devices 910 and the GPU 920 are mounted may be mounted on a package substrate 940. The package substrate 940 may be mounted on solder balls 950. The memory controller 925 may employ the memory controller 100 in FIG. 1.

Each of the stacked memory devices 910 may be implemented in various forms, and may be a memory device in a high bandwidth memory (HBM) form in which a plurality of layers are stacked. Accordingly, each of the stacked memory devices 910 may include a buffer die and a plurality of memory dies, and each of the plurality of memory dies may include a memory cell array and an on-die ECC engine.

The plurality of stacked memory devices 910 may be mounted on the interposer 930, and the GPU 920 may communicate with the plurality of stacked memory devices 910. For example, each of the stacked memory devices 910 and the GPU 920 may include a physical region, and communication may be performed between the stacked memory devices 910 and the GPU 920 through the physical regions.

As mentioned above, in the semiconductor memory device according to example embodiments, the on-die ECC engine may receive at least one of the main data and a codeword that is pre-stored in a target page, may generate a third parity data by applying different error patterns to the first type of uncorrectable errors associated with a main data provided from an outside and the first type of uncorrectable errors associated with the pre-stored codeword. In addition, the on-die ECC engine may identify a type of the uncorrectable errors based on syndrome matching the different error patterns.

The present disclosure may be applied to semiconductor memory devices and memory systems employing the ECC.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:
1. A semiconductor memory device comprising:
 a memory cell array including a plurality of volatile memory cells coupled to a plurality of word-lines and a plurality of bit-lines;
 a link error correction code (ECC) engine configured to:
  receive a first codeword received from a memory controller, wherein the first codeword includes main data and a first parity data; and
  perform a first ECC decoding on the first codeword to generate the main data from the first codeword; and
 an on-die ECC engine configured to:
  receive the main data from the link ECC engine;
  perform a first ECC encoding on the main data received from the link ECC engine to generate a second parity data; and
  generate a second codeword including the main data and the second parity data,
 wherein the on-die ECC engine, in response to a result of the first ECC decoding indicating that the first codeword includes a first type of uncorrectable errors,
  generates a third codeword by changing at least one of bits of the second codeword based on a first type of error pattern associated with the first type of uncorrectable errors, and
  provides the third codeword to a first target page of the memory cell array,
 wherein the first type of uncorrectable errors occurs during a data transmission between the memory controller and the semiconductor memory device.

2. The semiconductor memory device of claim 1,
 wherein the link ECC engine includes a link ECC decoder configured to:
  perform the first ECC decoding on the first codeword by using a first ECC; and
  generate a first error flag indicating whether the first codeword includes the first type of uncorrectable errors.

3. The semiconductor memory device of claim 2,
wherein the on-die ECC engine includes:
 an ECC encoder configured to perform the first ECC encoding on the main data received from the link ECC engine to generate the second codeword by using a second ECC;
 an error data generator configured to generate, in response to an error pattern signal, one of the third codeword by replacing the second parity data with a third parity data associated with the first type of uncorrectable errors and the third codeword by applying the first type of error pattern to the second codeword; and
 a demultiplexer configured to provide the second codeword to one of the error data generator and the first target page in response to the first error flag.

4. The semiconductor memory device of claim 3,
wherein the error data generator is configured to generate,
 in response to a first error pattern signal of the error pattern signal, the third codeword by applying the first type of error pattern to the second codeword received from the demultiplexer, the first error pattern signal indicating that the main data of the first codeword include the first type of uncorrectable errors and the first type of error pattern identifying the first type of uncorrectable errors.

5. The semiconductor memory device of claim 4,
wherein the on-die ECC engine further includes an ECC decoder configured to:
 perform, in a time when the semiconductor memory device is performing one of a masked write operation and a scrubbing operation, an ECC decoding on a codeword that is pre-stored in a second target page; and
 generate a second error flag that indicates whether the pre-stored codeword includes a second type of uncorrectable errors which occurs in memory cells in the second target page storing the pre-stored codeword,
wherein the error data generator is configured to:
 receive the second codeword from the demultiplexer; and
 generate the third codeword, in response to a second error pattern signal of the error pattern signal, by applying a second type of error pattern to the second codeword, and
wherein the second error pattern signal indicates that the pre-stored codeword includes the second type of uncorrectable errors, and the second type of error pattern is different from the first type of error pattern and identifies the second type of uncorrectable errors.

6. The semiconductor memory device of claim 5,
wherein the on-die ECC engine further includes:
 a selection signal generator configured to generate a first selection signal and a second selection signal based on the first error flag and the second error flag;
 a second demultiplexer connected to the error data generator and the memory cell array, wherein the second demultiplexer provides, in response to a first logic level of the first selection signal, the second codeword including the first type of uncorrectable errors to the error data generator and provides, in response to a second logic level of the first selection signal, the second codeword not including the first type of uncorrectable errors to the first target page; and
 a register configured to:
  store the first type of error pattern and the second type of error pattern; and
  provide the error data generator with one of the first error pattern signal indicating that the main data of the first codeword include the first type of uncorrectable errors and the second error pattern signal indicating that the pre-stored codeword includes the second type of uncorrectable errors based on the second selection signal.

7. The semiconductor memory device of claim 5,
wherein the error data generator is configured to generate the third codeword by performing exclusive OR operation on the second codeword and a data set, and
wherein the data set includes a default data and one of the first type of error pattern and the second type of error pattern, each bit of the default data being zero.

8. The semiconductor memory device of claim 5,
wherein the ECC decoder includes:
 a syndrome generation circuit configured to generate a syndrome based on one of the second codeword and the third codeword; and
 a decoding status flag generator configured to generate the second error flag and a decoding status flag indicating a status of an error in the main data based on the syndrome.

9. The semiconductor memory device of claim 8,
wherein the decoding status flag generator is configured to generate the decoding status flag indicating that the main data of the third codeword includes the first type of uncorrectable errors in response to the syndrome matching the first type of error pattern.

10. The semiconductor memory device of claim 8,
wherein the decoding status flag generator is configured to generate the decoding status flag indicating that the main data of the third codeword includes the second type of uncorrectable errors in response to the syndrome matching the second type of error pattern.

11. The semiconductor memory device of claim 8,
wherein the decoding status flag generator is configured to generate the decoding status flag indicating that a correctable error occurs when the syndrome has a non-zero values, does not match the first type of error pattern, and does not match the second type of error pattern.

12. A semiconductor memory device comprising:
a memory cell array including a plurality of volatile memory cells coupled to a plurality of word-lines and a plurality of bit-lines;
an on-die error correction code (ECC) engine configured to:
 receive a pre-stored codeword from a first target page of the memory cell array, the pre-stored codeword including main data and parity data;
 perform an ECC decoding on the pre-stored codeword;
 generate a decoding status flag based on a result of the ECC decoding; and
 transmit the decoding status flag to a memory controller; and
a link ECC engine configured to:
 perform an ECC encoding on the main data to generate link parity data; and
 transmit the main data and the link parity data to the memory controller,
wherein the on-die ECC engine is further configured to generate the decoding status flag indicating that the pre-stored codeword includes a first type of uncorrectable errors in response to the result of the ECC decoding corresponding to a first type of error pattern, and generate the decoding status flag indicating that the pre-stored codeword includes a second type of uncorrectable errors in response to the result of the ECC decoding corresponding to a second type of error pattern, and wherein the first type of uncorrectable errors occurs during a data transmission between the memory controller and the semiconductor memory device, and the second type of uncorrectable errors occurs in memory cells of the memory cell array.

13. The semiconductor memory device of claim 12, wherein the on-die ECC engine includes an on-die ECC decoder configured to:
  perform the ECC decoding on the pre-stored codeword by using a first ECC; and
  generate an error flag indicating whether the pre-stored codeword including the second type of uncorrectable errors.

14. The semiconductor memory device of claim 13, wherein the ECC decoder includes:
  a syndrome generation circuit configured to generate a syndrome based on the pre-stored codeword; and
  a decoding status flag generator configured to generate the error flag and the decoding status flag indicating that the main data include an error based on the syndrome,
  wherein the decoding status flag generator is configured to:
    generate the decoding status flag indicating that the main data of the pre-stored codeword includes the first type of uncorrectable errors in response to the syndrome matching the first type of error pattern; and
    generate the decoding status flag indicating that the main data of the pre-stored codeword includes the second type of uncorrectable errors in response to the syndrome matching the second type of error pattern.

15. The semiconductor memory device of claim 12, wherein the semiconductor memory device performs one of:
  a read-modify-write operation on a second target page of the memory cell array;
  a scrubbing operation on the second target page and a read-modify-write operation on the second target page; and
  a read operation on the second target page performed after a scrubbing operation on the second target page.

16. The semiconductor memory device of claim 12, further comprising:
  a buffer die; and
  a plurality of memory dies, the plurality of memory dies stacking on the buffer die and configured to convey data through a plurality of through silicon via (TSV) lines,
  wherein the buffer die includes the link ECC engine, and
  wherein at least one of the plurality of memory dies includes the memory cell array and the on-die ECC engine.

17. The semiconductor memory device of claim 12, further comprising:
  a control logic circuit configured to control the on-die ECC engine based on a command and an address received from the memory controller.

18. A semiconductor memory device comprising:
  a memory cell array including a plurality of volatile memory cells coupled to a plurality of word-lines and a plurality of bit-lines; and
  an on-die error correction code (ECC) engine configured to:
    receive, in a write operation, data and a first poison flag from a memory controller, the first poison flag indicating whether the data corresponds to poisoned data;
    generate a first parity data by performing an ECC encoding on the data;
    generate a second codeword by applying a first type of error pattern to a first codeword including the data and the first parity data based on the first poison flag; and
    provide the second codeword to a target page of the memory cell array,
  wherein the on-die ECC engine is further configured to:
    read, in a read operation, the second codeword from the target page;
    recover the data by performing an ECC decoding on the second codeword; and
    exclude, in response to a result of the ECC decoding indicating that the data corresponds to the poisoned data, error bits associated with the data from an error count in a scrubbing operation.

19. The semiconductor memory device of claim 18, wherein the on-die ECC engine is further configured to:
  generate a second poison flag and a decoding status flag based on the result of the ECC decoding; and
  transmit the data, the second poison flag and the decoding status flag to the memory controller,
  wherein the second poison flag indicates whether the data corresponds to the poisoned data, and
  wherein the decoding status flag indicates whether the data includes uncorrectable errors.

20. The semiconductor memory device of claim 18, wherein the on-die ECC engine is further configured to skip, in response to the result of the ECC decoding indicating that the data corresponds to the poisoned data, writing back corrected data for the data in the target page in the scrubbing operation.

* * * * *